United States Patent
Koyama et al.

(10) Patent No.: US 12,138,834 B2
(45) Date of Patent: Nov. 12, 2024

(54) MOLDING MOLD FOR COMPOSITE BODY

(71) Applicant: NISSAN MOTOR CO., LTD., Yokohama (JP)

(72) Inventors: Masaki Koyama, Kanagawa (JP); Takashi Oda, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 396 days.

(21) Appl. No.: 17/613,589

(22) PCT Filed: May 24, 2019

(86) PCT No.: PCT/IB2019/000635
§ 371 (c)(1),
(2) Date: Nov. 23, 2021

(87) PCT Pub. No.: WO2020/240245
PCT Pub. Date: Dec. 3, 2020

(65) Prior Publication Data
US 2022/0234265 A1    Jul. 28, 2022

(51) Int. Cl.
*B29C 45/26* (2006.01)
*B29C 45/14* (2006.01)
*B29K 705/00* (2006.01)

(52) U.S. Cl.
CPC ........ *B29C 45/14073* (2013.01); *B29C 45/26* (2013.01); *B29K 2705/00* (2013.01)

(58) Field of Classification Search
CPC ......... B29C 45/00; B29C 45/10; B29C 45/14; B29C 45/1407; B29C 45/14073; B29C 45/20; B29C 45/26
See application file for complete search history.

(56) References Cited

U.S. PATENT DOCUMENTS

| | | |
|---|---|---|
| 2015/0336304 A1 | 11/2015 | Bosg et al. |
| 2017/0015357 A1 | 1/2017 | Mukainakano et al. |

FOREIGN PATENT DOCUMENTS

| | | | | |
|---|---|---|---|---|
| CN | 104703783 A | | 6/2015 | |
| JP | 2008243715 A | * | 10/2008 | |
| JP | 2017-019428 A | | 1/2017 | |
| JP | 2017107523 A | * | 6/2017 | ............ B29C 45/00 |
| WO | WO 2011/001809 A1 | | 1/2011 | |

* cited by examiner

*Primary Examiner* — Jeffry H Aftergut
(74) *Attorney, Agent, or Firm* — Foley & Lardner LLP

(57) ABSTRACT

A molding mold for a composite body 1 for forming a composite body A that integrally molds a resin member R on one main surface of a metal panel P1, including at least a fixed mold 2 and a movable mold 3, and including, in a mold on the resin member side among the fixed mold 2 and the movable mold 3, a panel fixing mechanism 4 that fixes an edge portion of the metal panel P1 in a state in which the fixed mold 2 and the movable mold are open. The molding mold for a composite body 1 eliminates a movable body with respect to a molding space of the resin member R and overcomes the generation of burr in the resin member R, and forms an exposed metal portion B on the edge portion of the metal panel P1 on the resin member R side by the panel fixing mechanism 4.

12 Claims, 23 Drawing Sheets

MOLDING MOLD FOR COMPOSITE BODY

TECHNICAL FIELD

The present invention relates to a molding mold for a composite body used for integrally molding a resin member on a metal panel in manufacturing a composite body that integrates a metal panel with a resin member.

BACKGROUND ART

For example, one of conventional composite bodies is described in Patent Document 1. The composite body described in Patent Document 1 is used in a vehicle body structure of an automobile, and is a structure integrally molding a reinforcement structure made of resin in a space formed between an outer frame and an inner frame each made of metal. Such composite bodies are bonded to other members such as another composite body or a metal member by welding. Therefore, the composite body needs to have formed an exposed metal portion having no resin thereon, as a portion to be welded, in integrally molding the reinforcement structure on the frame made of metal.

For example, one of molding molds used in manufacturing a composite body as like one described above is described in Patent Document 2. The molding mold described in Patent Document 2 has a resin portion integrally molded on a metal body, in manufacturing a composite body having the resin portion on one side of the metal body. This molding mold includes a fixed mold having an injecting portion for molten resin and a movable mold that forms a molding space with the fixed mold, and incorporates a sliding mold that protrudes and sinks with respect to the molding space.

The molding mold described above disposes the metal body on the fixed mold and closes the fixed mold with the movable mold, while making the sliding mold protrude into the molding space and abut with the metal body. Thereafter, the molding mold has molten resin injected between the fixed mold and the metal body to integrally mold the resin portion on one side of the metal body. At this time, an exposed metal portion having no resin is formed at the abutted region of the sliding mold on the metal body.

CITATION LIST

Patent Document

Patent Document 1: Japanese Unexamined Patent Publication No. 2017-019428 Patent Document 2: WO 2011/001809

SUMMARY OF INVENTION

Technical Problem

However, in a conventional molding mold as described above, the fixed mold is of a structure including a sliding mold that protrudes into the molding space for the resin portion. Hence, a gap inevitably exists between the fixed mold and the sliding mold, and there is the problem that the molten resin intrudes in that gap and generates burr. The burr generated on the composite body bites into the fixed mold, thus causing peeling-off between the metal body and the resin portion at the time of separating the composite body from the mold. In addition, to avoid conflict with a counter component to be combined with the composite body, a step to remove the burr in advance will be necessary.

The present invention is accomplished in view of the above conventional situation, and an object thereof is to provide a molding mold for a composite body, which molding mold can form an exposed metal portion on an edge portion of a metal panel without generating burr, in a molding mold for a composite body for integrally molding a resin member on one main surface of the metal panel.

Solution to Problem

The molding mold for a composite body according to the present invention is a molding mold for a composite body for forming a composite body, the molding mold configured to integrally mold a resin member on one main surface of a metal panel. This molding mold for a composite body includes at least a fixed mold and a movable mold, and a panel fixing mechanism configured to fix an edge portion of the metal panel on a mold on a resin member side among the fixed mold and the movable mold, in a state in which the fixed mold and the movable mold are open, wherein an exposed metal portion is formed on the edge portion of the metal panel on the resin member side by the panel fixing mechanism.

The molding mold for a composite body in the configuration described above disposes the metal panel on the fixed mold to integrally mold the resin member. At this time, the mold on the resin member side on which the edge portion of the metal panel is fixed is any one of the fixed mold and the movable mold, depending on a feeding position of the molten resin with respect to the metal panel. For example, in injection molding of resin, in a case in which the molten resin is fed from the fixed mold side, the resin member is formed between the fixed mold and the metal panel; hence, the mold on the resin member side will be the fixed mold. On the other hand, in compression molding of the resin, in a case in which the molten resin is fed on the metal panel disposed on the fixed mold, the resin member is formed between the movable mold and the metal panel; hence, the mold on the resin member side will be the movable mold.

Advantageous Effects of Invention

The molding mold for a composite body according to the present invention, by employing the panel fixing mechanism configured to fix the edge portion of the metal panel on the mold on the resin member side in a state in which the fixed mold and the movable mold are open, the exposed metal portion can be formed on the edge portion of the metal panel on the resin member side without using a movable body with respect to a molding space for the resin member; this thus eliminates the generation of burr in the resin member.

As such, the molding mold for a composite body described above can form the exposed metal portion on the edge portion of the metal panel on the resin member side without generating burr, in a molding mold for a composite body for integrally molding the resin member on one main surface of the metal panel.

DESCRIPTION OF EMBODIMENTS

First Embodiment

Figure 1:
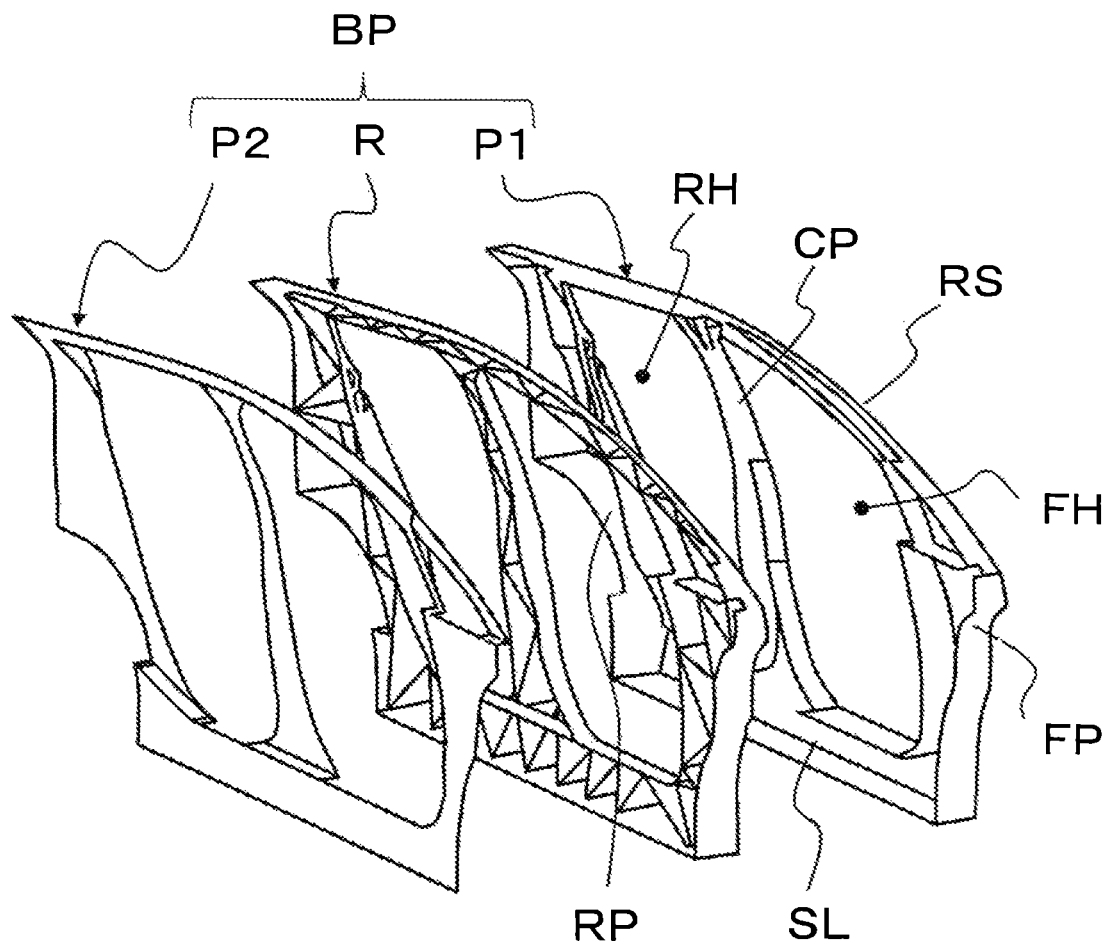
FIG. 1 is an exploded perspective view illustrating a body side panel as one example of a composite body.
Figure 2:
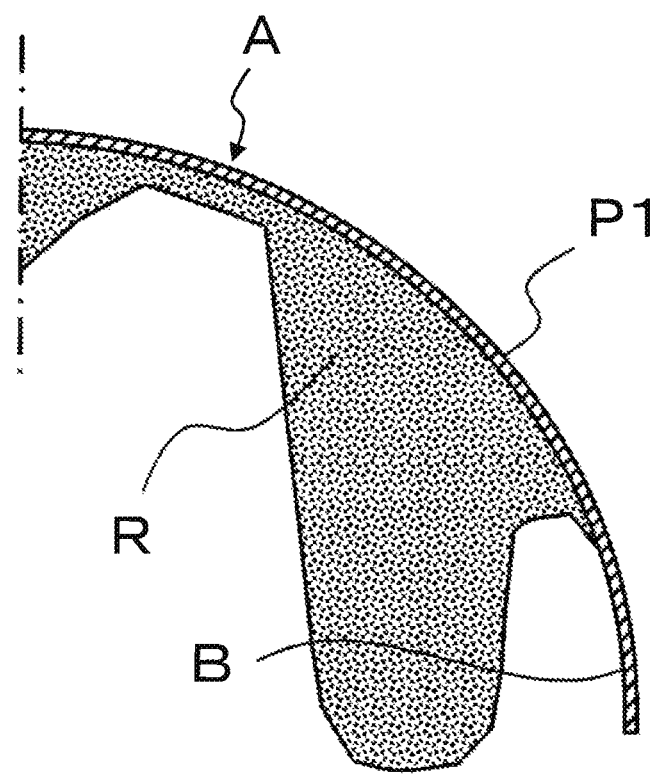
FIG. 2 is a cross-sectional view of a roof portion of the body side panel.

FIG. 1 is a view illustrating a body side panel BP being one example of a composite body. The body side panel BP includes an outer panel P1 being one metal panel, an inner panel P2 being the other metal panel, and a resin member R integrally molded on the outer panel P1, and is of a structure bonding the inner panel P2 to the outer panel P1.

The illustrated body side panel BP has, as representatively applied with reference symbols on the outer panel P1, a front pillar portion FP, a center pillar portion CP, and a rear pillar portion RP, each extending in a vertical direction of a vehicle body. Moreover, the body side panel BP has a continuous roof side portion RS across a vehicle front-rear direction in such a manner aligning top edge portions of the pillar portions FP, CP, and RP, and a continuous sill portion SL across the vehicle front-rear direction in such a manner aligning lower edge portions of the pillar portions FP, CP, and RP.

The body side panel BP further constitutes a frame shape having a front side opening FH for mounting a front door and a rear side opening RH for mounting a rear door, between the front pillar portion FP and the center pillar portion CP and between the center pillar portion CP and the rear pillar portion RP, respectively.

The outer panel P1 and the inner panel P2 are not limited in their materials, however as one example, are an aluminum alloy advantageous in reducing weight, and are molded in a predefined three-dimensional form by press working blank material.

The resin member R is not limited in its material, however is a thermoplastic resin whose reinforcement material is noncontinuous carbon fiber (CFRTP), and can be integrally molded on the outer panel P1 by injection molding or compression molding. The resin member R is formed on a surface of the outer panel P1 on an inner side of the vehicle body, and integrally has a plurality of reinforcement ribs that protrude internally of the vehicle body.

The molding mold for a composite body according to the present invention is used in manufacturing a composite body A that integrates a resin member on one main surface of a metal panel. The composite body A in this embodiment is one integrally molding a resin member R on one main surface (surface on an inner side of vehicle body) of the outer panel P1 being a metal panel, as illustrated in the cross section of the roof side portion RS of the body side panel BP.

Moreover, the composite body A configures the body side panel BP by bonding the inner panel P2 to the outer panel P1 by spot welding. Therefore, the composite body A has an exposed metal portion B at which a metal surface is exposed, as a portion to be welded on an edge portion of the outer panel P1 on the resin member R side. In this embodiment, the exposed metal portion B is formed on an upper edge portion of the roof side portion RS of the outer panel P1 (edge portion on the roof side) across its longitudinal direction (vehicle body front-rear direction).

Figure 3:
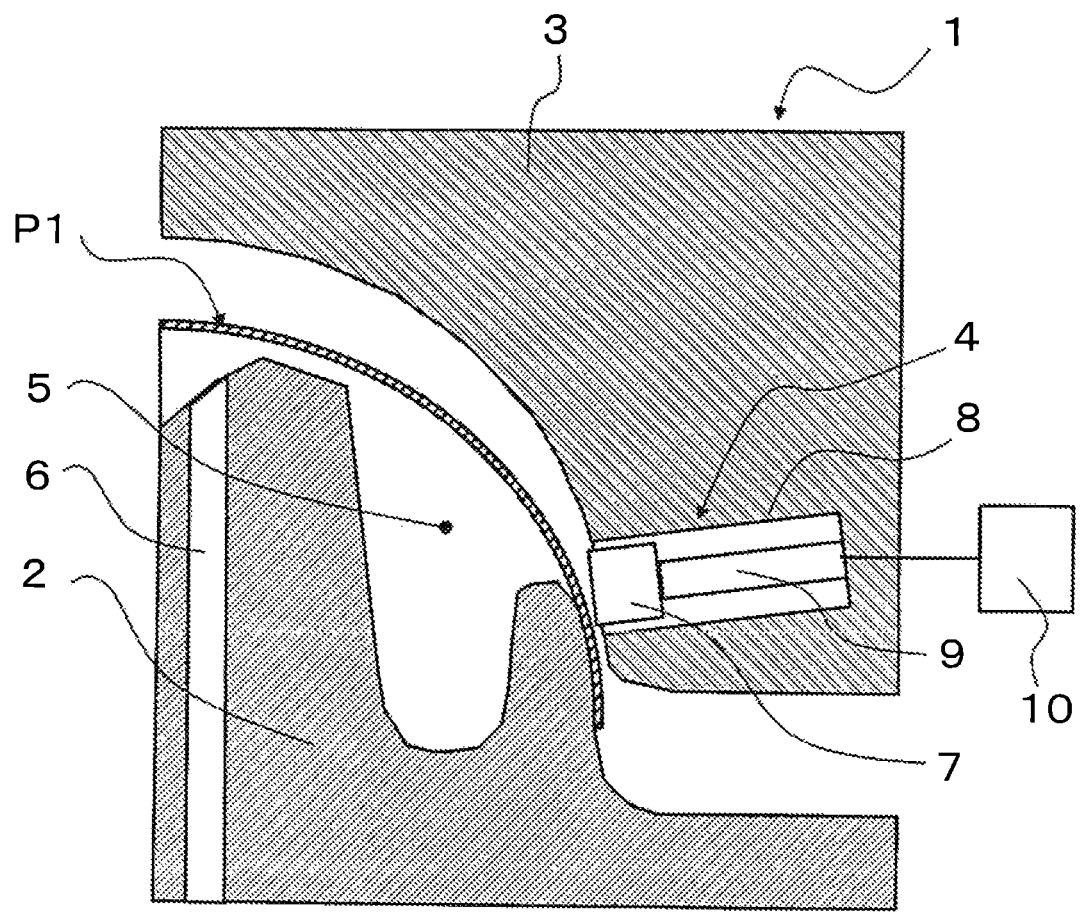
FIG. 3 is a cross-sectional view of an essential portion illustrating an open state of the mold in a first embodiment of the molding mold for a composite body.

The molding mold for a composite body 1 illustrated in FIG. 3 is one that integrally molds the resin member R on one main surface of the outer panel P1 in manufacturing the composite body A described above, and at least includes a lower fixed mold 2 and an upper movable mold 3. The movable mold 3 is liftable by a drive device not illustrated, and forms a molding space 5 between the fixed mold 2 at a descent limit thereof. The molding mold for a composite body 1 includes, in a mold on the resin member R side among the fixed mold 2 and the movable mold 3, a panel fixing mechanism 4 configured to fix an edge portion of the outer panel P1 in a state in which the fixed mold 2 and the movable mold 3 are open. The panel fixing mechanism 4 forms the exposed metal portion B on the edge portion of the outer panel P1 on the resin member R side.

The molding mold for a composite body 1 of this embodiment integrally molds the resin member R on the outer panel P1 by injection molding of resin. Therefore, the molding mold for a composite body 1 has, in the fixed mold 2, a feeding path 6 that communicates with a feeding source of molten resin outside the drawing, an ejector pin for separating the molded composite body A from the mold, and the like. Furthermore, with the molding mold for a composite body 1, after arranging the outer panel P1 to the fixed mold 2 and moving the movable mold 3 to its descent limit, the molten resin is injected through the feeding path 6 into the molding space 5. Therefore, the mold on the resin member R side among the fixed mold 2 and the movable mold 3 is the fixed mold 2. Furthermore, the panel fixing mechanism 4 fixes the edge portion of the outer panel P1 in the state in which the fixed mold 2 and the movable mold 3 are open, and forms the exposed metal portion BP on that edge portion.

Here, the outer panel P1 is a blank material that is press worked into a predefined three-dimensional shape as described previously, and thus has unavoidable shape errors caused by thickness change at the time of the press working and springback. Therefore, the outer panel P1, at the time of disposing on the fixed mold 2, can particularly become unstable in the positioning of the edge portion; the molten resin may intrude between this edge portion and the fixed mold 2. This thus may prevent the forming of a favorable exposed metal portion 5. Faults caused by such intrusion of the molten resin may not only occur in injection molding of resin as like in this embodiment, but also may occur similarly in compression molding of resin later described.

In this regard, the molding mold for a composite body 1 inhibits, by the panel fixing mechanism 4, the molten resin from intruding between the fixed mold 2 and the edge portion of the outer panel P1, in filling the molten resin carried out after closing the mold, by fixing the edge portion of the outer panel P1 in the state in which the fixed mold 2 and the movable mold 3 are open, and forms the favorable exposed metal portion B on the edge portion of the outer panel P1.

The panel fixing mechanism 4 includes a slide pad 7 disposed advanceable and retractable in any one of the fixed mold 2 and the movable mold 3, which slide pad 7 presses against the edge portion of the outer panel P1 in an advanced position to closely contact the fixed mold 2. The panel fixing mechanism 4 in this embodiment includes the slide pad 7 in the movable mold 3.

Figure 4:
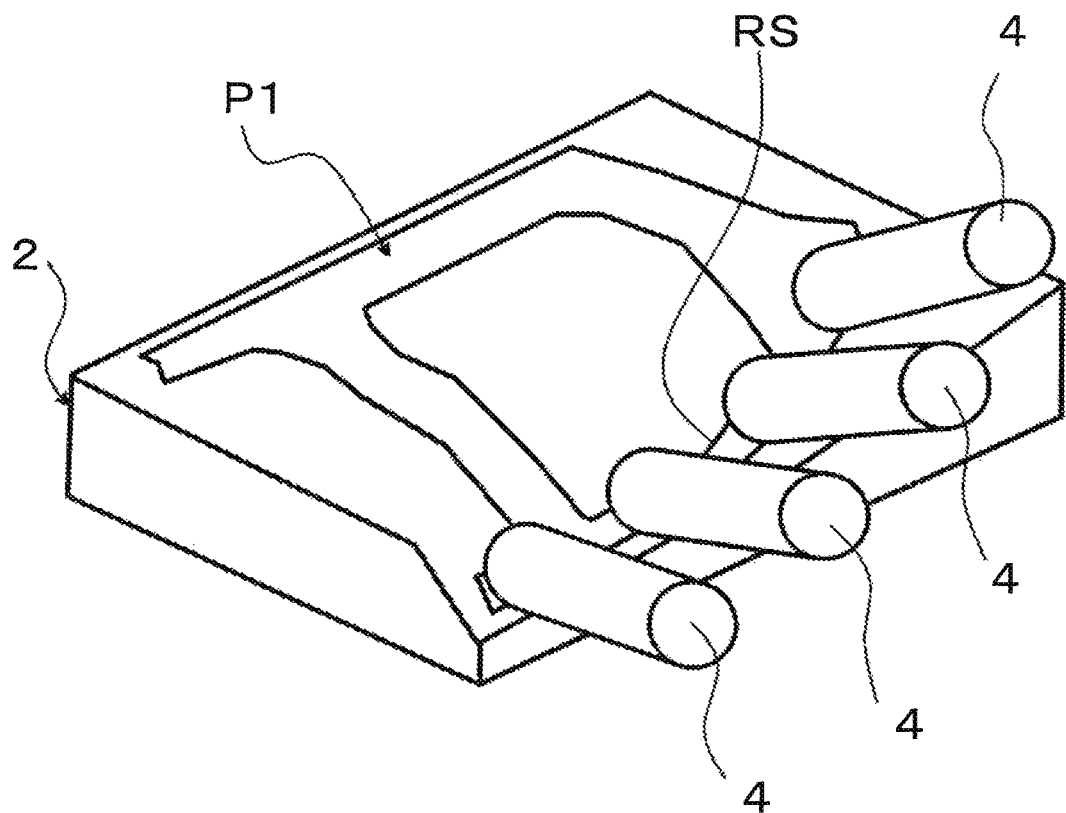
FIG. 4 is a perspective view illustrating a position of a panel fixing mechanism with respect to a fixed mold.

More specifically, the panel fixing mechanism 4 includes: a guide hole 8 opened from an inner portion of the movable mold 3 to the molding space 5; the slide pad 7 housed in the guide hole 8; an actuator 9 that performs the advancing and retracting drive of the slide pad 7; and a controller 10 disposed outside the movable mold 3. This panel fixing mechanism 4 is disposed at a predefined pitch in a longitudinal direction of the roof side portion RS of the outer panel P1 disposed on the fixed mold 2, as illustrated in FIG. 4.

The molding mold for a composite body 1 including the panel fixing mechanism 4 described above, after disposing the outer panel P1 on the fixed mold 2, drives the actuator 9 by the controller 10 to move the slide pad 7 forward, to make a tip of the slide pad 7 to protrude from an inner surface of the movable mold 3, as illustrated in FIG. 3. FIG. 3 illustrates a state in which the movable mold 3 is descending; a top dead center of the actual movable mold 3 is upper than the illustrated position. The slide pad 7 is moved forward before or while the movable mold 3 descends, that is to say, in the state in which the fixed mold 2 and the movable mold 3 are open.

Figure 5:
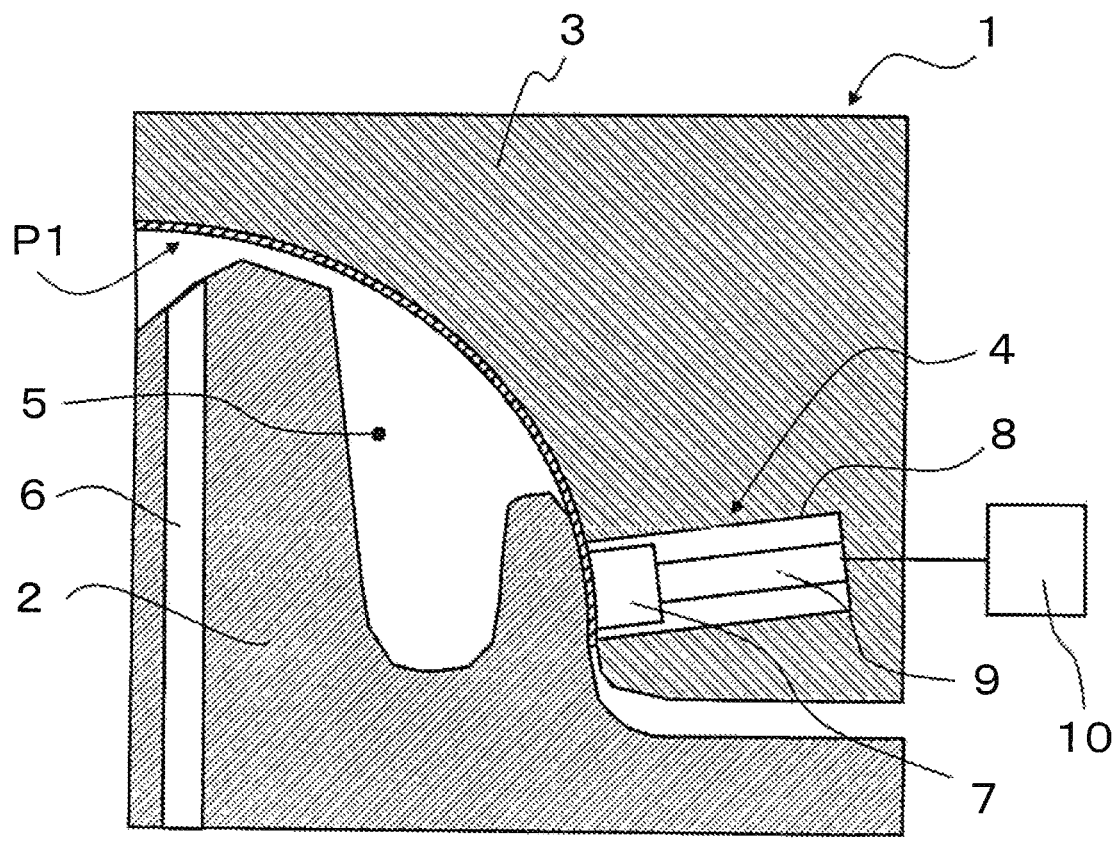
FIG. 5 is a cross-sectional view of an essential portion illustrating a closed state of the mold in continuation to FIG. 3.

In the molding mold for a composite body 1 described above, the tip of the slide pad 7 contacts the outer panel P1 in advance while the movable mold 3 is descending, and fixes the edge portion of the outer panel P. Furthermore, the molding mold for a composite body 1, as illustrated in FIG. 5, presses against the edge portion of the outer panel P1 with the slide pad 7 in a state in which the movable mold 3 reaches the dead end point, to completely contact the fixed mold 2. As such, the panel fixing mechanism 4 fixes the edge portion of the outer panel P1 in the state in which the fixed mold 2 and the movable mold 3 are open (a state prior to the movable mold 3 reaching the bottom dead center).

Figure 6:
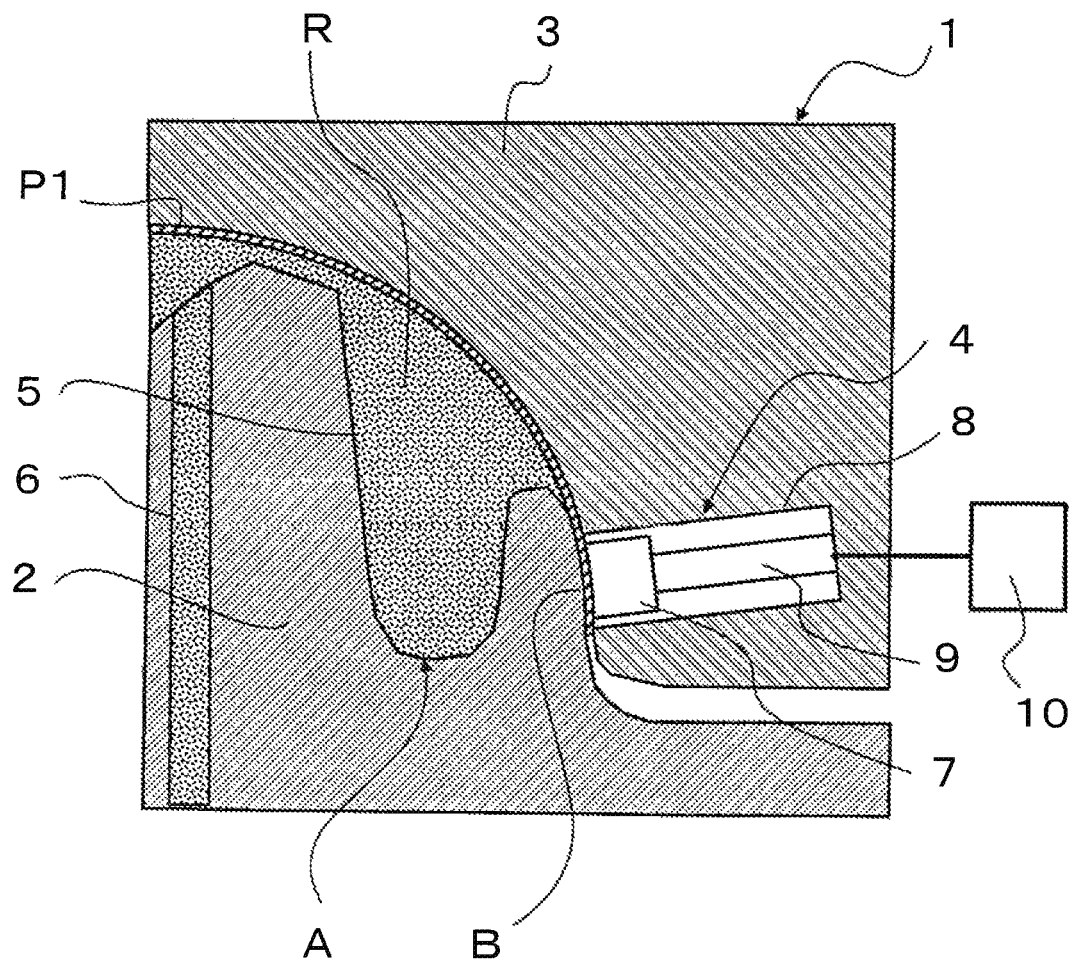
FIG. 6 is a cross-sectional view illustrating a state in which molten resin is fed in continuation to FIG. 5.

Thereafter, the molding mold for a composite body 1 feeds the molten resin into the molding space 5 through the feeding path 6, as illustrated in FIG. 6. At this time, the molding mold for a composite body 1 closely contacts the edge portion of the outer panel P1 to the fixed mold 2 by the slide pad of the panel fixing mechanism 4; this inhibits the molten resin from intruding between the fixed mold 2 and the edge portion of the outer panel P1. Accordingly, the molding mold for a composite body 1 integrally molds the resin member R on the outer panel P1 together with curing of the molten resin, and obtains a composite body A having the exposed metal portion B on the edge portion of the outer panel P1 on the resin member R side. The composite body A is separated from the fixed mold 2 by the ejector pin upon lifting the movable mold 3.

Since the molding mold for a composite body 1 described above employs the panel fixing mechanism 4 that fixes the edge portion of the outer panel P1 in the state in which the fixed mold 2 and the movable mold are open, the exposed metal portion B may be formed on the edge portion of the outer panel P on the resin member R side, by using no movable body with respect to the molding space 5 of the resin member R as like a conventional sliding mold. That is to say, the molding mold for a composite body 1 can eliminate the generation of burr in the resin member R by eliminating the movable body with respect to the molding space 5 of the resin member R.

As such, the molding mold for a composite body 1, in a molding mold for integrally molding the resin member R on one main surface of the outer panel P1, can form a favorable exposed metal portion B at which the metal surface is exposed at the edge portion of the outer panel P1 on the resin member R side without causing the generation of burr. Accordingly, the molding mold for a composite body 1 described above overcomes the problem caused by the burr. That is to say, the molding mold for a composite body 1 described above overcomes a situation in which the outer panel P1 peels off from the resin member R caused by biting of the burr at the time of mold separation, and also eliminates the need of an additional process for removing the burr, thus enabling to contribute to the reduction in manufacturing costs.

Moreover, since the molding mold for a composite body 1 described above employs the panel fixing mechanism 4 that includes the slide pad 7, the pressing force of the slide pad 7 against the fixed mold 2 can be controlled; it is thus possible to more securely prevent the intrusion of the molten resin between the fixed mold 2 and the outer panel P1, and form a favorable exposed metal portion B.

FIGS. 6 to 17 are views describing second to eleventh embodiments of the molding mold for a composite body according to the present invention. In the following embodiments, the same reference signs are denoted to the same components as those of the first embodiment, and detailed descriptions thereof are omitted.

Second Embodiment

Figure 7:
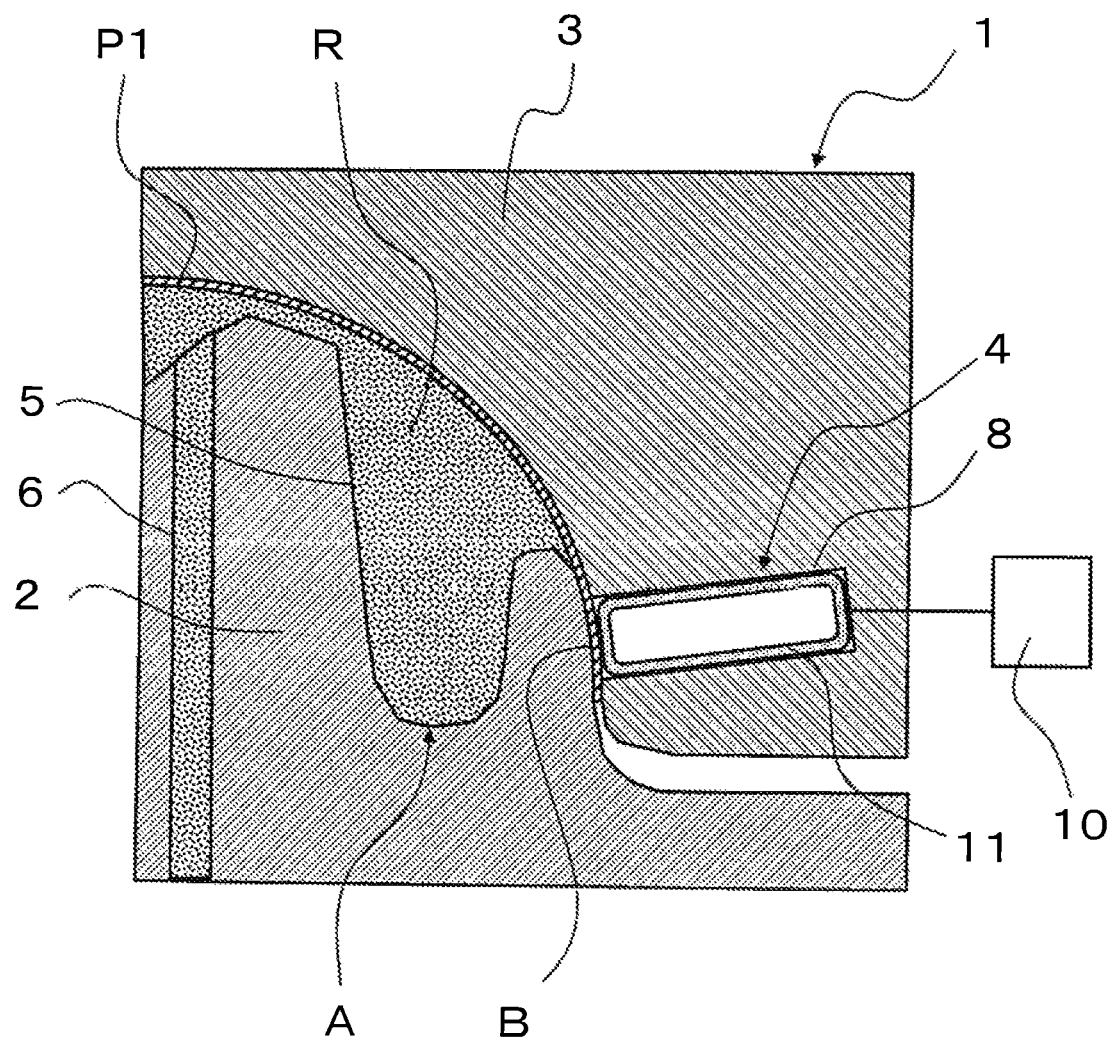
FIG. 7 is a cross-sectional view of an essential portion describing a second embodiment of the molding mold for a composite body.

The molding mold for composite body 1 illustrated in FIG. 7 has the panel fixing mechanism 4 disposed expandable and contractable in any one of the fixed mold 2 and the movable mold 3, and includes an elastic pad 11 that presses against the edge portion of the outer panel (metal panel) P1 together with the expansion to closely contact the fixed mold 2. The panel fixing mechanism 4 of the illustrated example includes the elastic pad 11 in the movable mold 3. The elastic pad 11 is a hollow body made of resin having flexibility.

More specifically, the panel fixing mechanism 4 includes: the guide hole 8 opened from the inner portion of the movable mold 3 to the molding space 5; the elastic pad 11 housed in the guide hole 8; and the controller 10 that feeds and discharges working fluid such as air or the like to the elastic pad 11. By feeding the working fluid inside the elastic pad 11 by the controller 10 in the state in which the fixed mold 2 and the movable mold 3 are open, this panel fixing mechanism 4 causes the elastic pad to expand, and makes its tip protrude from the guide hole 8.

Thereafter, the panel fixing mechanism 4 fixes the edge portion of the outer panel P1 at the tip of the elastic pad 11 while the movable mold 3 is descending as with the first embodiment, and in the state in which the mold is closed by the movable mold 3 reaching to the bottom dead center, the edge portion of the outer panel P1 is pressed to closely contact the fixed mold 2. The elastic pad 11 contracts by discharging the working fluid inside; this thus allows for releasing the fixing of the outer panel P1.

The molding mold for a composite body 1 including the panel fixing member 4 described above, as with the previous embodiment, can form a favorable exposed metal portion B at which the metal surface is exposed at the edge portion of the outer panel P1 on the resin member R side without generating burr, in a molding mold for integrally molding the resin member R on one main surface of the outer panel P1.

Moreover, since the molding mold for a composite body 1 described above employs the panel fixing mechanism 4 including the elastic pad 11, the pressing force of the elastic pad 11 against the fixed mold 2 can be controlled; it is thus possible to more securely prevent the intrusion of the molten resin between the fixed mold 2 and the outer panel P1, and form a favorable exposed metal portion B.

Third Embodiment

Figure 8:
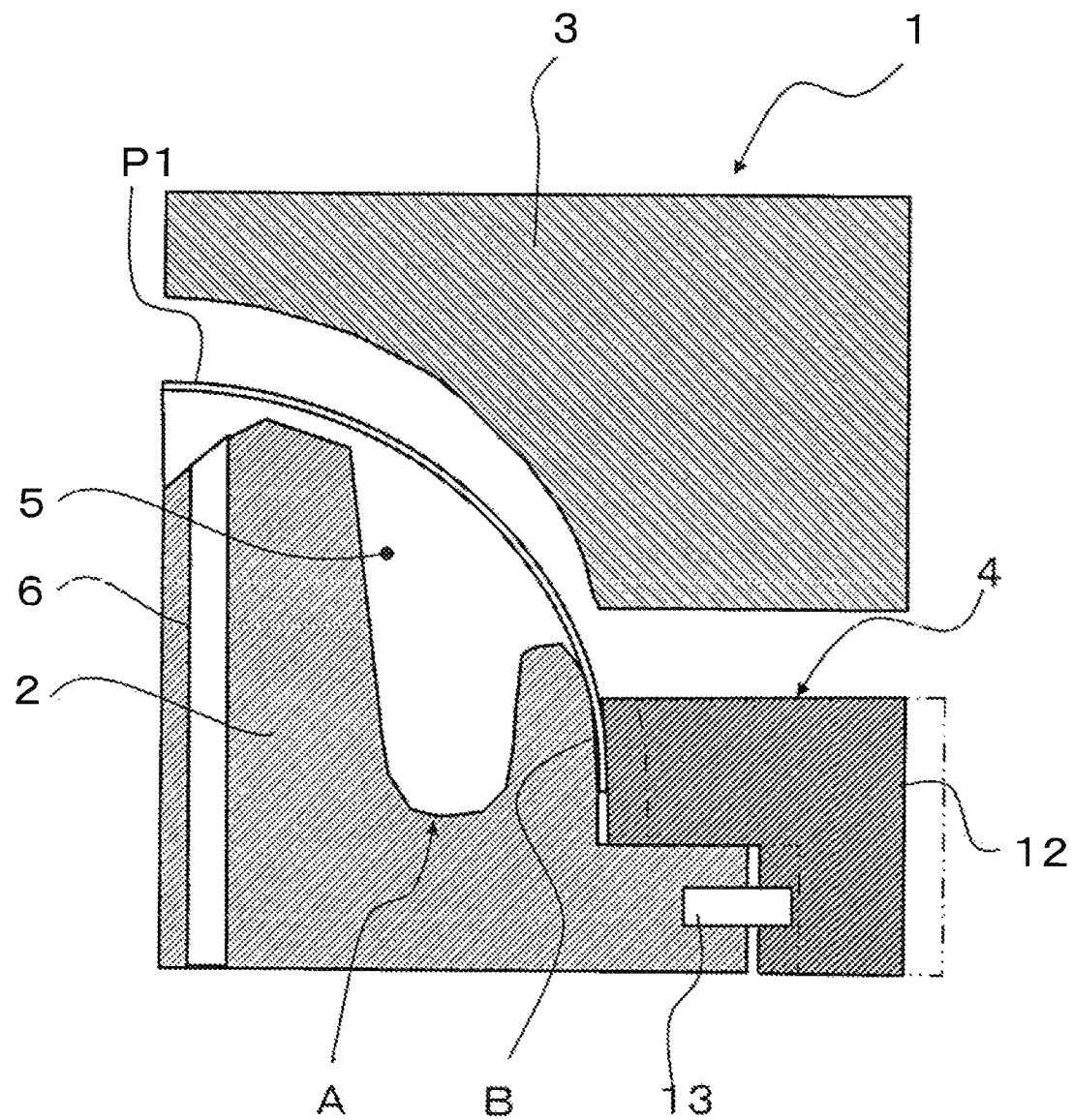
FIG. 8 is a cross-sectional view of an essential portion illustrating an open state of the mold in a third embodiment of the molding mold for a composite body.
Figure 9:
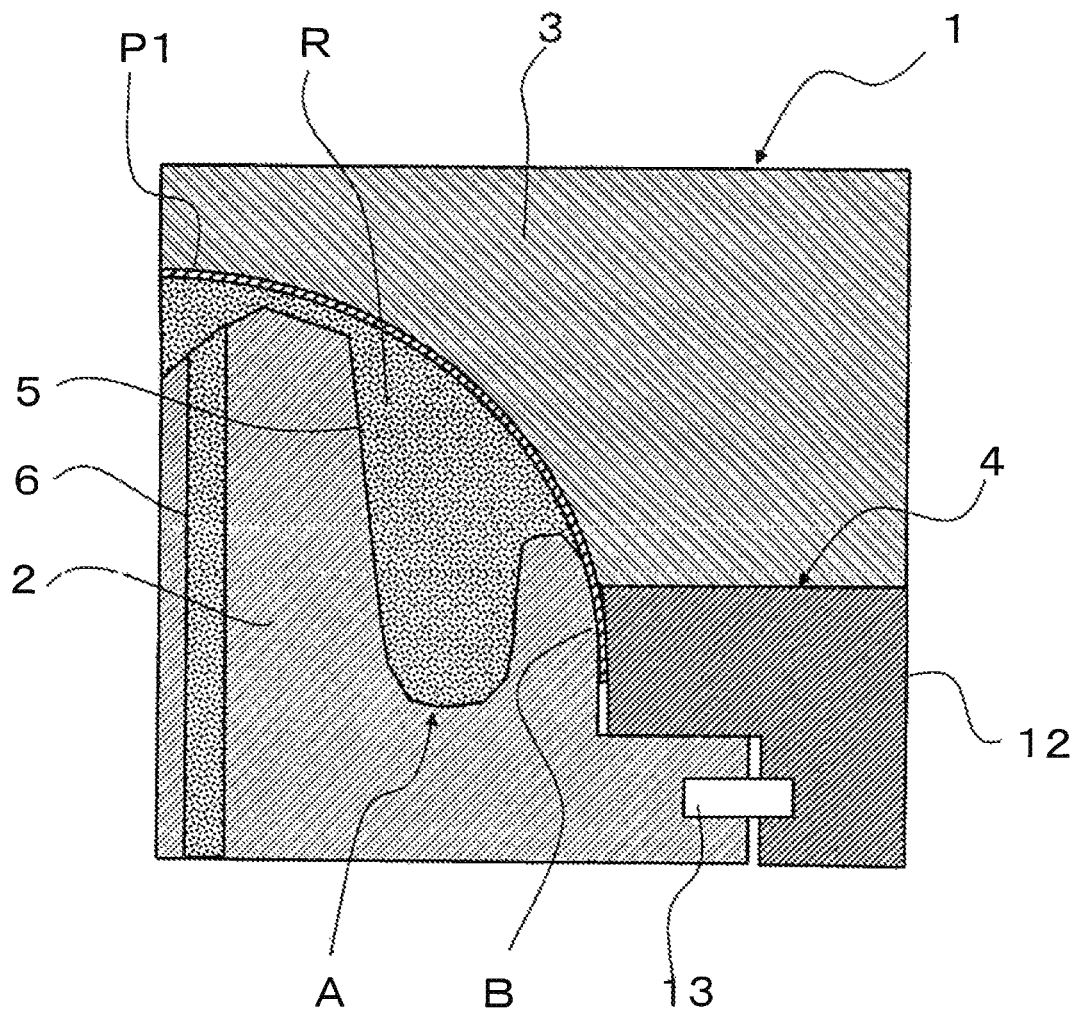
FIG. 9 is a cross-sectional view illustrating a state in which molten resin is fed in continuation to FIG. 8.

The molding mold for composite body 1 illustrated in FIG. 8 has the panel fixing mechanism 4 disposed advanceable and retractable in any one of the fixed mold 2 and the movable mold 3, and includes a slide pad 12 that presses against the edge portion of the outer panel (metal panel) P1 together with the advancing to closely contact the fixed mold 2. The panel fixing mechanism 4 of the illustrated example includes the slide pad 12 in the fixed mold 2.

More specifically, the panel fixing mechanism 4 includes a block-shaped slide pad 12 incorporated between a side portion of the fixed mold 2 and a bottom portion of the movable mold 3, and a drive device 13 that performs reciprocating drive of this slide pad 12 in an inner-outer direction (left-right direction in FIG. 8) of the fixed mold 2.

The molding mold for a composite body 1 described above advances the slide pad 12 in the state in which the fixed mold 2 and the movable mold 3 are open, to fix the edge portion of the outer panel P1, as illustrated in FIG. 8. Thereafter, the molding mold for a composite body 1 descends the movable mold 3 to close the fixed mold 2 and the movable mold 3 and fills the molten resin to integrally form the resin member R on the outer panel P1, to form the metal exposure portion B on the edge portion on the resin member R side of the outer panel P1.

The molding mold for a composite body 1 including the panel fixing member 4 described above, as with the previous embodiment, can form a favorable exposed metal portion B at which the metal surface is exposed at the edge portion of the outer panel P1 on the resin member R side without generating burr, in a molding mold for integrally molding the resin member R on one main surface of the outer panel P1.

The molding mold for a composite body 1 described above is one whose panel fixing mechanism 4 includes the slide pad 12 on the fixed mold 2 side. Different from a movable body that advances and retracts with respect to the molding space 5 of the resin member R as with the conventional sliding mold, this slide pad 12 presses and fixes the edge portion of the outer panel P1 from an opposite side of the resin member R against the fixed mold 2 in the state in which the fixed mold 2 and the movable mold 3 are open; hence, no burr will generate in the resin member R.

Moreover, since the molding mold for a composite body 1 described above employs the panel fixing mechanism 4 including the slide pad 12, the pressing force of the slide pad 12 against the fixed mold 2 can be controlled; it is thus possible to more securely prevent the intrusion of the molten resin between the fixed mold 2 and the outer panel P1, and form a favorable exposed metal portion B.

Furthermore, the molding mold for a composite body 1 described above is of a configuration including the block-shaped slide pad 12 and the drive device 13 that reciprocally drives this slide pad 12 in the fixed mold 2, however in the case of a configuration including the block-shaped slide pad 12, it is also possible to employ a cam mechanism that drives the slide pad 12 in an advancing and retracting manner by cooperating with the lifting operation of the movable mold 3. In this case also, it is also possible to fix the edge portion of the outer panel P1 by advancing the slide pad 7 in advance while the movable mold 3 is descending.

In the molding mold for a composite body 1, in the case of fixing the edge portion of the outer panel P1 to the fixed mold 2, it may also be considered to dispose an elastic body on a mating face between the fixed mold 2 and the movable mold 3, and pressing and fixing the edge portion of the outer panel P1 together with the closing operation of the mold, for example. However, in this case, a large pressure for closing the mold will be applied repetitively on the elastic body, which would cause quick deterioration of the elastic body. In comparison, the first to third embodiments employ the slide pads 7, 12 and the elastic pad 11 that operate by a drive source separate from the mold closing operation. It is thus possible to maintain the function for a long period of time as well as facilitating the control of the pressing force.

Fourth Embodiment

Figure 10:
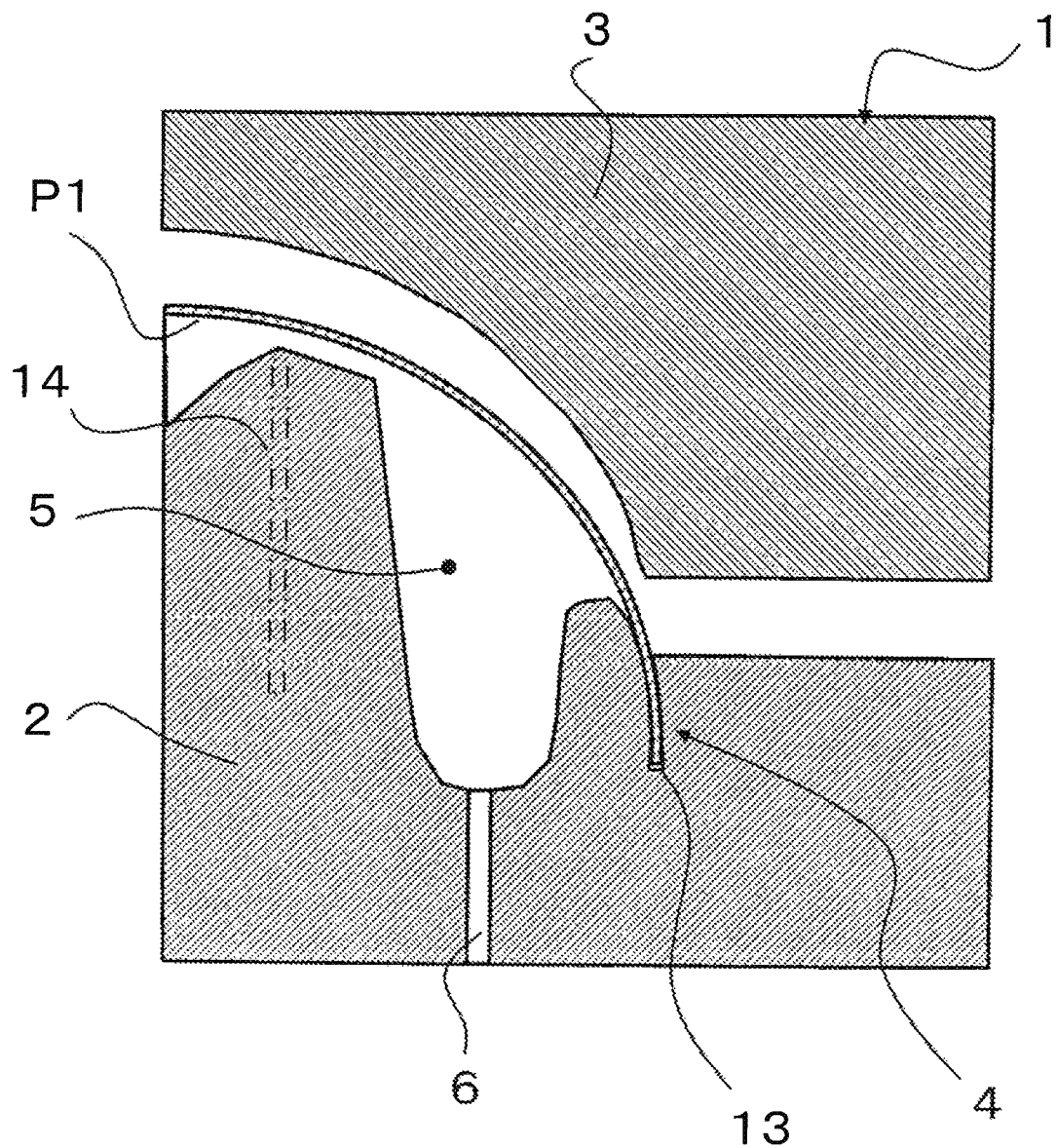
FIG. 10 is a cross-sectional view of an essential portion illustrating an open state of the mold in a fourth embodiment of the molding mold for a composite body.

The molding mold for a composite body 1 illustrated in FIG. 10 has the panel fixing mechanism 4 disposed in the fixed mold 2, and includes a recess portion 13 that houses and fixes the edge portion of the outer panel P1 in the state in which the fixed mold 2 and the movable mold 3 are open. The illustrated fixed mold 2 includes the feeding path 6 for the molten resin and an ejector pin 14 for mold separation illustrated by a virtual line.

The recess portion 13 of this panel fixing mechanism 4 does not press the edge portion of the outer panel 1 against the fixed mold 2, and hence, strictly speaking, very slightly allows for the molten resin to intrude between the fixed mold 2 and the outer panel P1. However, the recess portion 13 has the molten resin rapidly cured at around its mouth by appropriately setting various dimensions such as depth and width upon consideration of viscosity and the like of the molten resin, thus allowing for inhibiting the intrusion of the molten resin inside.

Figure 11:
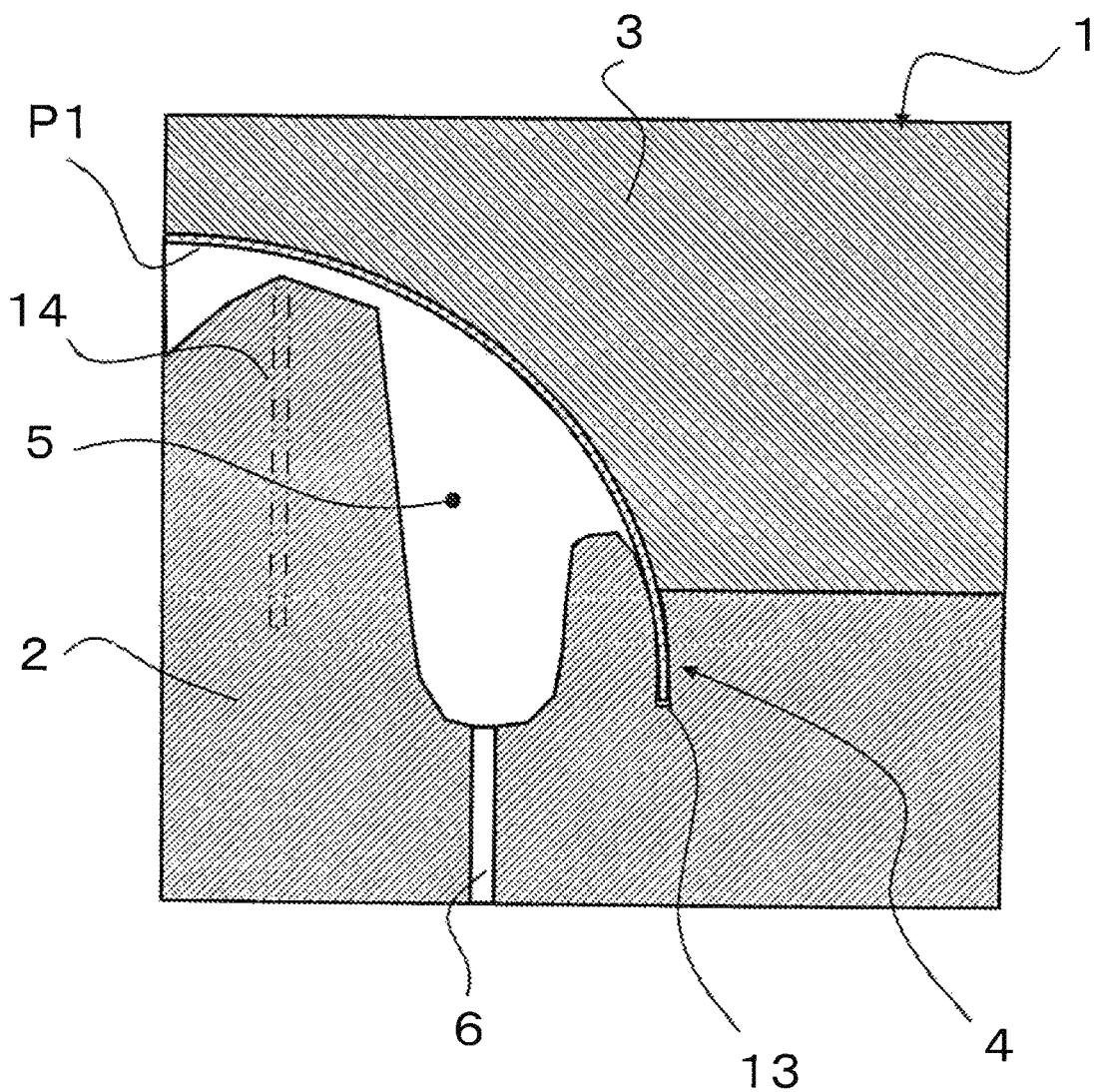
FIG. 11 is a cross-sectional view of an essential portion illustrating a closed state of the mold in continuation to FIG. 10.
Figure 12:
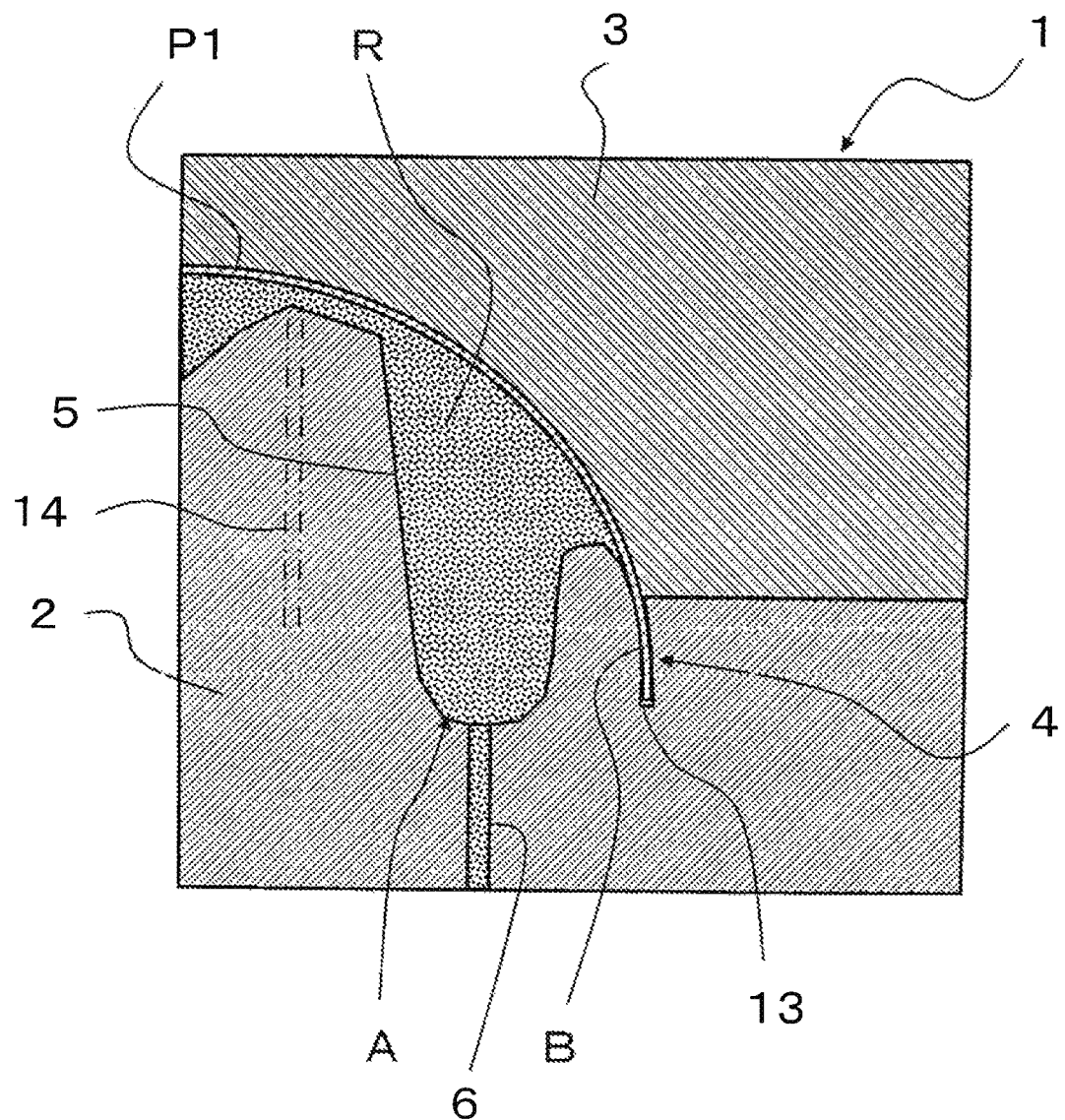
FIG. 12 is a cross-sectional view of an essential portion illustrating a state in which molten resin is filled in continuation to FIG. 11.
Figure 13:
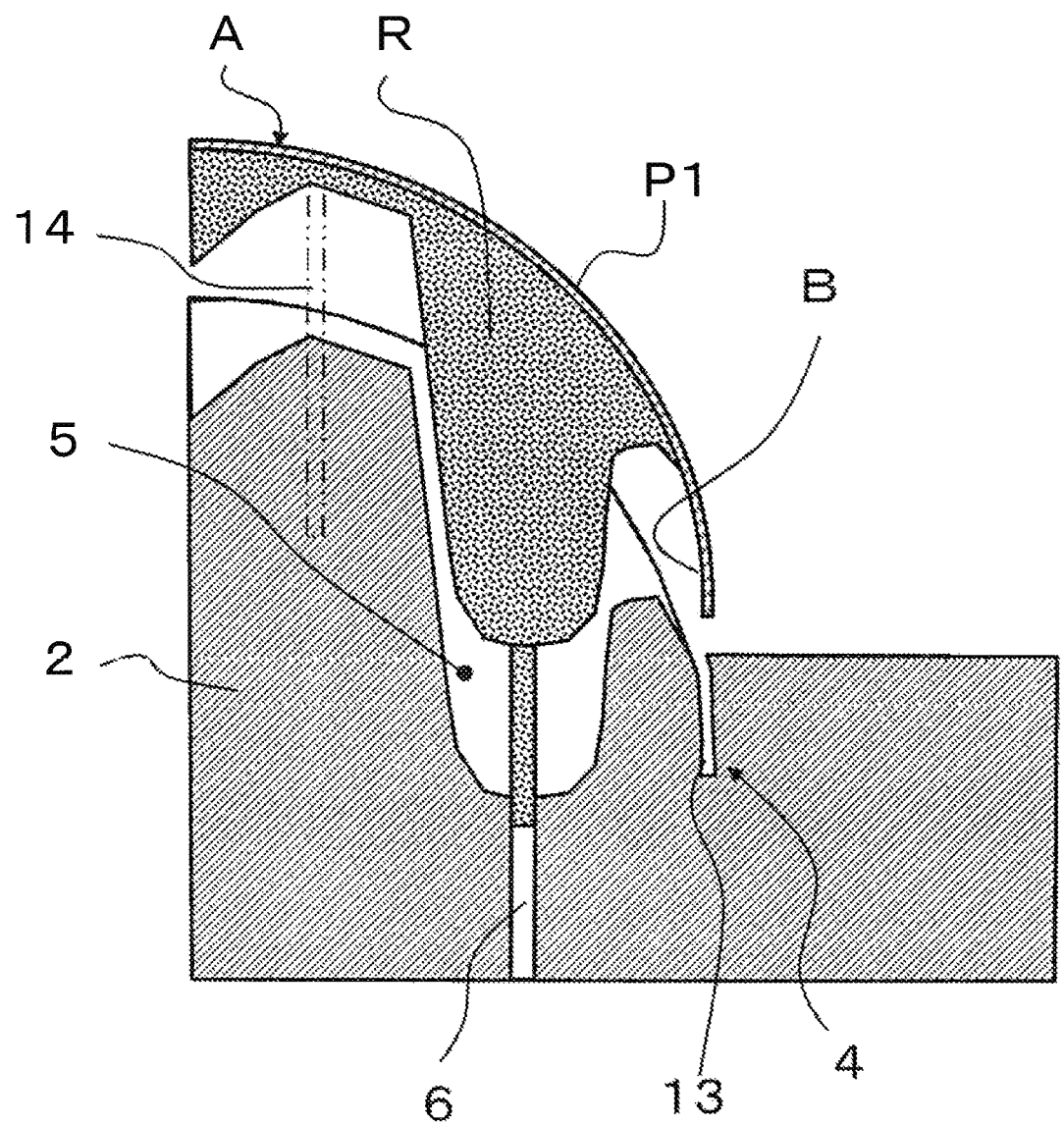
FIG. 13 is a cross-sectional view illustrating a state separating the composite body from the mold in continuation to FIG. 12.

The molding mold for a composite body 1 including the panel fixing mechanism 4 describe above makes the fixed mold 2 and the movable mold 3 in the closed state as illustrated in FIG. 11, and furthermore, when the molten resin is fed into the molding space 5, the molten resin rapidly cures at around the mouth of the recess portion 13 and inhibits the intrusion of the molten resin inside as illustrated in FIG. 12. Therefore, it is possible to obtain the composite body A having the exposed metal portion B of a sufficient region, as in a state at the time of mold separation illustrated in FIG. 13.

That is to say, the molding mold for a composite body 1 described above, as with the previous embodiments, integrates the resin member R with the outer panel P1 and allows to form a favorable exposed metal portion B at the edge portion of the outer panel P1 on the resin member R side, without generating burr in the resin member R.

Moreover, the molding mold for a composite body 1 described above, by employing the recess portion 13, can fix the edge portion of the outer panel. P1 and form a favorable exposed metal portion B by an extremely simple structure including no movable parts, and in disposing the outer panel P1 on the fixed mold 2, the positioning of the edge portion can be performed easily and securely.

Fifth Embodiment

Figure 14:
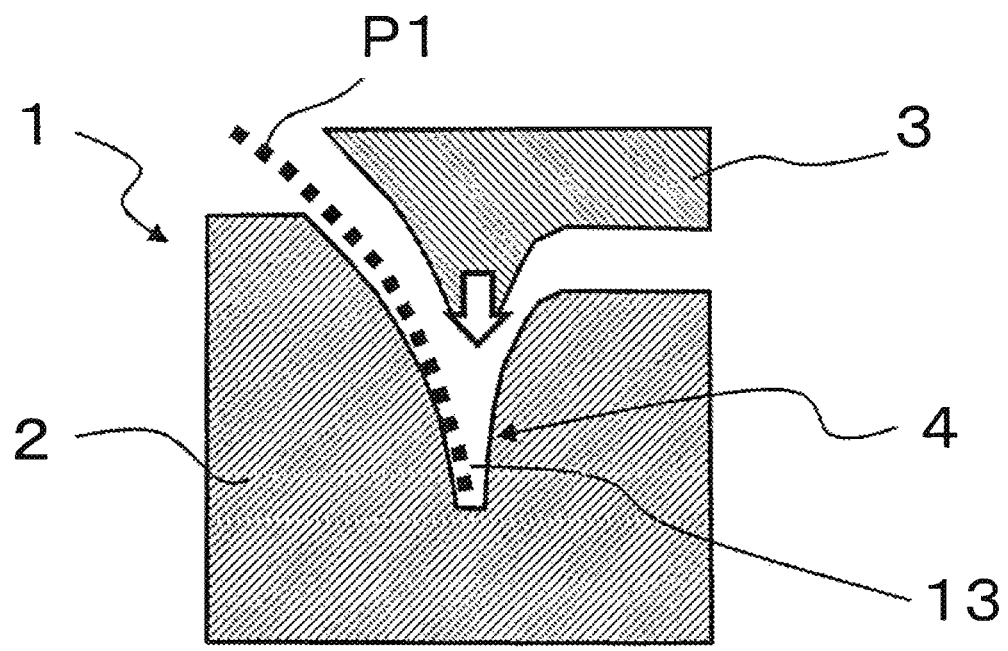
FIG. 14 is a cross-sectional view of an essential portion describing a fifth embodiment of the molding mold for a composite body.

The molding mold for a composite body 1 illustrated in FIG. 14 has the panel fixing mechanism 4 disposed in the fixed mold 2, and includes a recess portion 13 that houses and fixes the edge portion of the outer panel P1 in the state in which the fixed mold 2 and the movable mold 3 are open. Furthermore, the panel fixing mechanism 4 is of a structure in which a width dimension of the recess portion 13 gradually decreases from the opening to until reaching the bottom portion. The inner surface of the recess portion 3 continues smoothly from the opening to the bottom portion.

The molding mold for a composite body 1 including the panel fixing mechanism 4 described above, as with the previous embodiments, integrates the resin member R with the outer panel P1 without generating burr in the resin member R, and can form a favorable exposed metal portion B on the edge portion of the outer panel P1 by the recess portion 13.

Moreover, since the molding mold for a composite body 1 described above employs the recess portion 13 that gradually decreases in the width dimension from the opening to until reaching its bottom portion, in other words the recess portion 13 having a large width dimension at the opening, the edge portion of the outer panel P1 can be inserted easily, in disposing the outer panel P1 to the fixed mold 2. Therefore, the molding mold for a composite body 1 allows for easily and securely positioning the edge portion of the outer panel P1, even in a case in which there is a large shape error in the outer panel P1.

Sixth Embodiment

Figure 15:
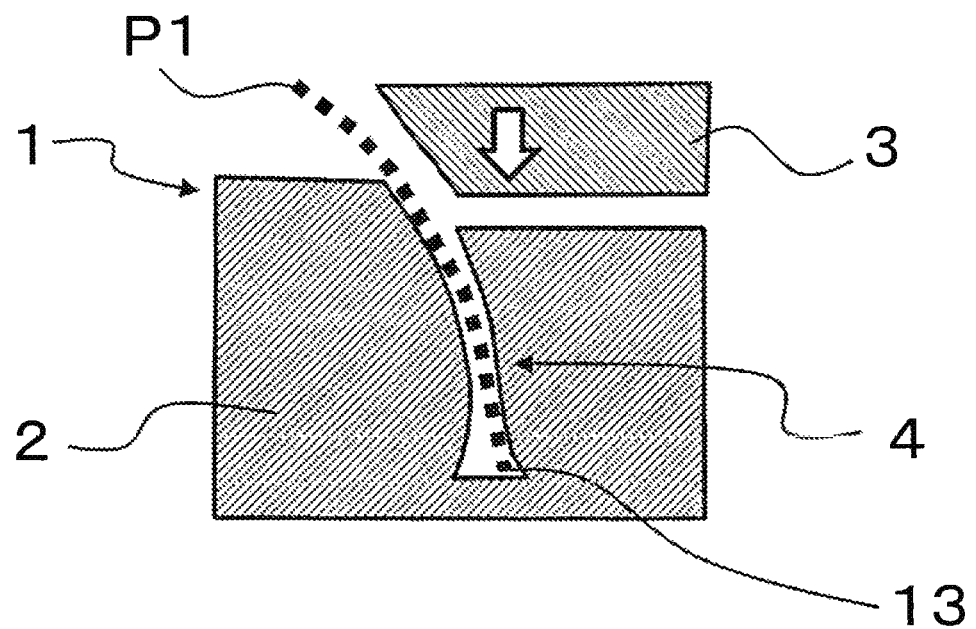
FIG. 15 is a cross-sectional view of an essential portion describing a sixth embodiment of the molding mold for a composite body.

The molding mold for a composite body 1 illustrated in FIG. 15 has the panel fixing mechanism 4 disposed in the fixed mold 2, and includes the recess portion 13 that houses and fixes the edge portion of the outer panel P1 in the state in which the fixed mold 2 and the movable mold 3 are open. Furthermore, the panel fixing mechanism 4 is of a structure in which the width dimension of the recess portion 13 gradually increases from a middle portion to until reaching its bottom portion. The inner surface of the recess portion 3 continues smoothly from the opening to the bottom portion.

The molding mold for a composite body 1 including the panel fixing mechanism 4 described above, as with the previous embodiments, integrates the resin member R with the outer panel P1 without generating burr in the resin member R, and can form a favorable exposed metal portion B on the edge portion of the outer panel P1 by the recess portion 13.

Moreover, since the molding mold for a composite body 1 described above employs the recess portion 13 that gradually increases in the width dimension from the middle portion to until reaching the bottom portion, it is possible to absorb the shape error in the outer panel P1 at the bottom portion side of the recess portion 13, in inserting the edge portion of the outer panel P1 into the recess portion 13.

Seventh Embodiment

Figure 16:
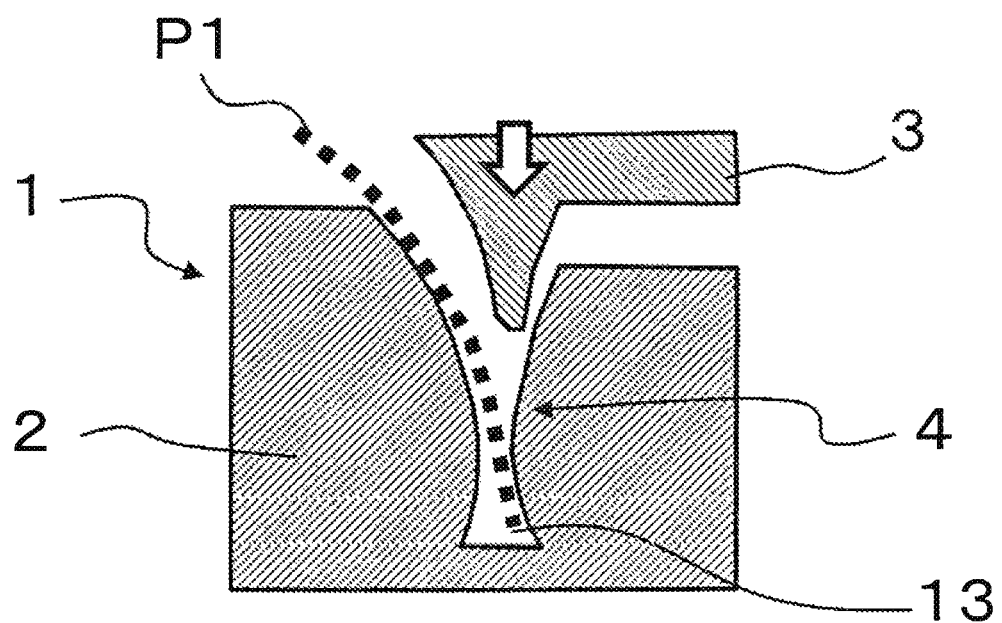
FIG. 16 is a cross-sectional view of an essential portion describing a seventh embodiment of the molding mold for a composite body.

The molding mold for a composite body 1 illustrated in FIG. 16 has the panel fixing mechanism 4 disposed in the fixed mold 2, and includes the recess portion 13 that houses and fixes the edge portion of the outer panel P1. Furthermore, the panel fixing mechanism 4 is of a structure in which the width dimension of the recess portion 13 gradually decreases from the opening to until reaching the middle portion, as well as gradually increasing from the middle portion to until reaching the bottom portion. The inner surface of the recess portion 3 continues smoothly from the opening to the bottom portion.

The molding mold for a composite body 1 including the panel fixing mechanism 4 described above, as with the previous embodiments, integrates the resin member R with the outer panel P1 without generating burr in the resin member R, and can form a favorable exposed metal portion B on the edge portion of the outer panel P1 by the recess portion 13.

Moreover, since the molding mold for a composite body 1 described above employs the recess portion 13 that gradually decreases in the width dimension from the opening to until reaching the middle portion, as well as gradually increasing in the width dimension from the middle portion to until reaching the bottom portion, it is possible to achieve the effects in each of the fifth and sixth embodiments. That is to say, the molding mold for a composite body 1 facilitates the insertion of the edge portion of the outer panel P1 in disposing the outer panel P1 to the fixed mold 2, and can absorb the shape error in the outer panel P1 at the bottom portion side of the recess portion 13 in inserting the edge portion of the outer panel P1 into the recess portion 13.

Furthermore, in the molding mold for a composite body 1 described above, opposing inner surfaces within the recess portion 13 are convex surfaces that face each other; this hence reduces sliding resistance between these inner surfaces and the outer panel P1, thus allowing for smoothly inserting the outer panel P1.

Eighth Embodiment

Figure 17:
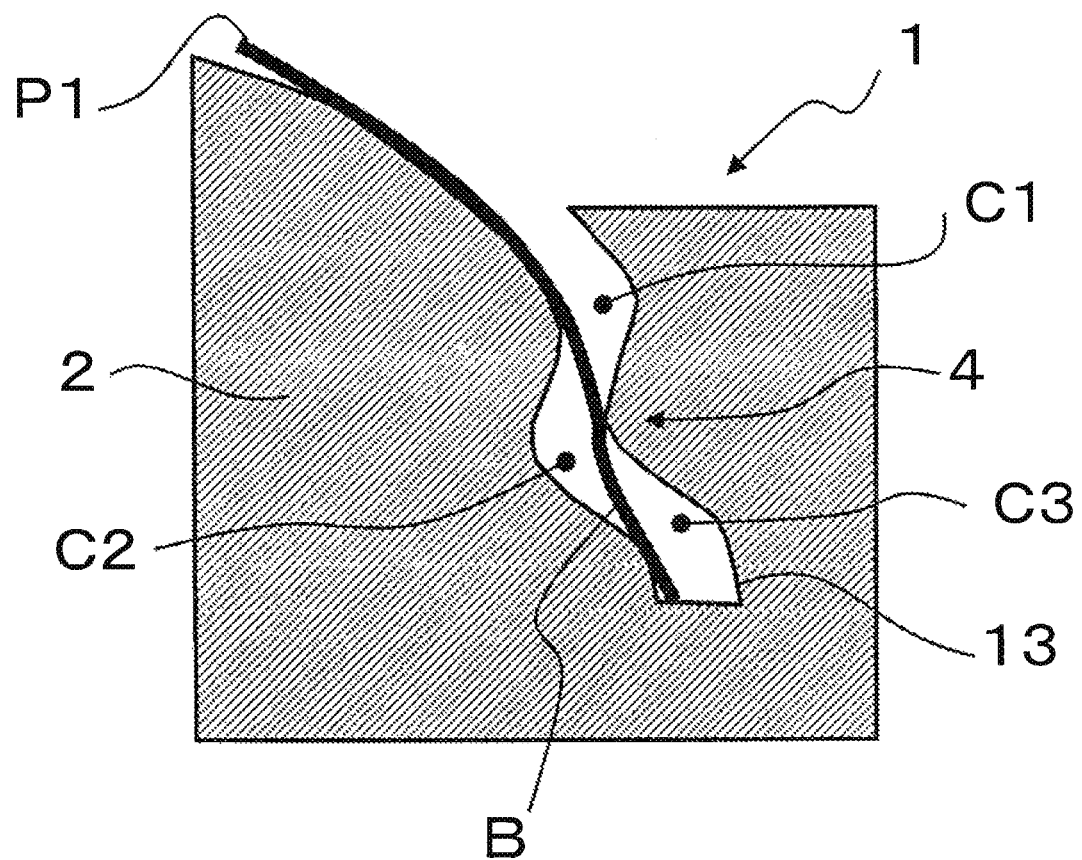
FIG. 17 is a cross-sectional view of an essential portion describing an eighth embodiment of the molding mold for a composite body.

The molding mold for a composite body 1 illustrated in FIG. 17 has the panel fixing mechanism 4 disposed in the fixed mold 2, and includes the recess portion 13 that houses and fixes the edge portion of the outer panel P1 in the state in which the fixed mold 2 and the movable mold 3 are open. Furthermore, the panel fixing mechanism 4 is of a structure in which the recess portion 13 meanders from the opening to until reaching its bottom portion. The illustrated recess portion 13 is of a form having, in a direction from the opening to the bottom portion, a curve C1 curving towards the inner side of the mold (left side in drawing) ahead of the opening, a curve C2 curving towards the outer side of the mold ahead of the curve C1, and a curve C3 curving towards a lower direction further ahead of the curve C2 to reach the bottom portion. The inner surface of the recess portion 3 continues smoothly from the opening to the bottom portion.

The molding mold for a composite body 1 including the panel fixing mechanism 4 described above, as with the previous embodiments, integrates the resin member R with the outer panel P1 without generating burr in the resin member R, and can form a favorable exposed metal portion B on the edge portion of the outer panel P1 by the recess portion 13.

Moreover, since the molding mold for a composite body 1 described above employs the recess portion 13 that meanders from the opening to until reaching the bottom portion, the edge portion of the outer panel P1 housed in the recess portion 13 is pressed against the convex surfaces being the inner surfaces of the curves C1 to C3. Accordingly, the molding mold for a composite body 1 restricts the edge portion of the outer panel P1 within the recess portion 13, and causes close contact between the outer panel P1 and the convex surface of the uppermost curve C1, thus inhibiting the intrusion of the molten resin. As a result, the molding mold for a composite body 1 can facilitate the positioning of the edge body of the outer panel P1, as well as allowing forming of a favorable exposed metal portion B having no resin member R at that edge portion.

Ninth Embodiment

Figure 18:
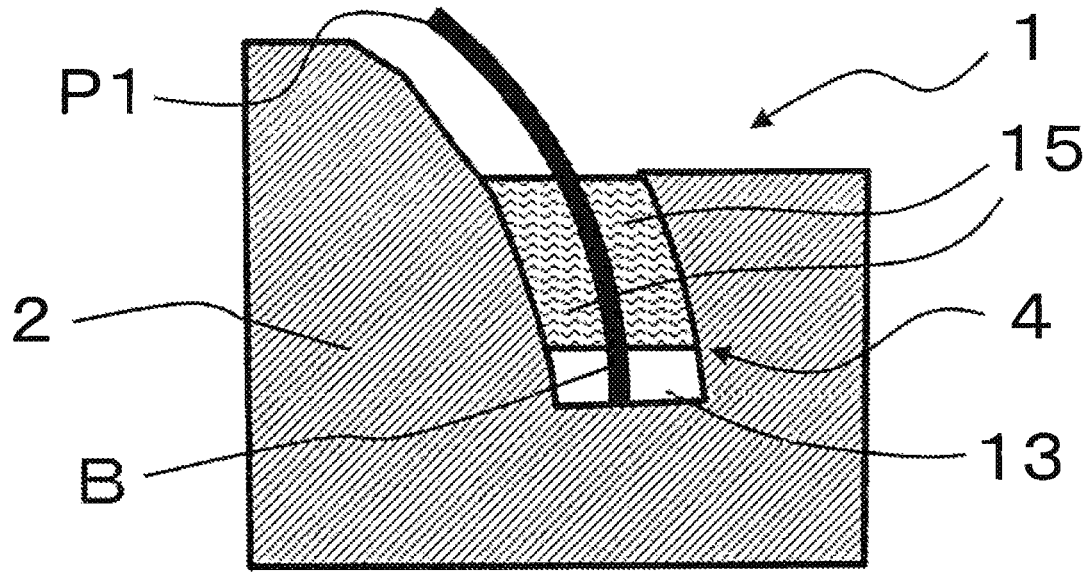
FIG. 18 is a cross-sectional view of an essential portion describing a ninth embodiment of the molding mold for a composite body.

The molding mold for a composite body 1 illustrated in FIG. 18 has the panel fixing mechanism 4 disposed in the fixed mold 2, and includes the recess portion 13 that houses and fixes the edge portion of the outer panel P1 in the state in which the fixed mold 2 and the movable mold 3 are open. Furthermore, the panel fixing mechanism 4 includes, within the recess portion 13, an elastic body 15 that sandwiches the edge portion of the outer panel P1.

The molding mold for a composite body 1 including the panel fixing mechanism 4 described above, as with the previous embodiments, integrates the resin member R with the outer panel P1, and can form a favorable exposed metal portion B at the edge portion of the outer panel P1 by the recess portion 13 having the elastic body 15, without generating burr in the resin member R.

Moreover, since the molding mold for a composite body 1 described above sandwiches the edge portion of the outer panel P1 with the elastic body 15 within the recess portion 13, the positioning of that edge portion is performed easily and securely, and the intrusion of the molten resin is securely inhibited by the elastic body 15, thus allowing for forming a favorable exposed metal portion B at the edge portion of the outer panel P1.

Tenth Embodiment

Figure 19:
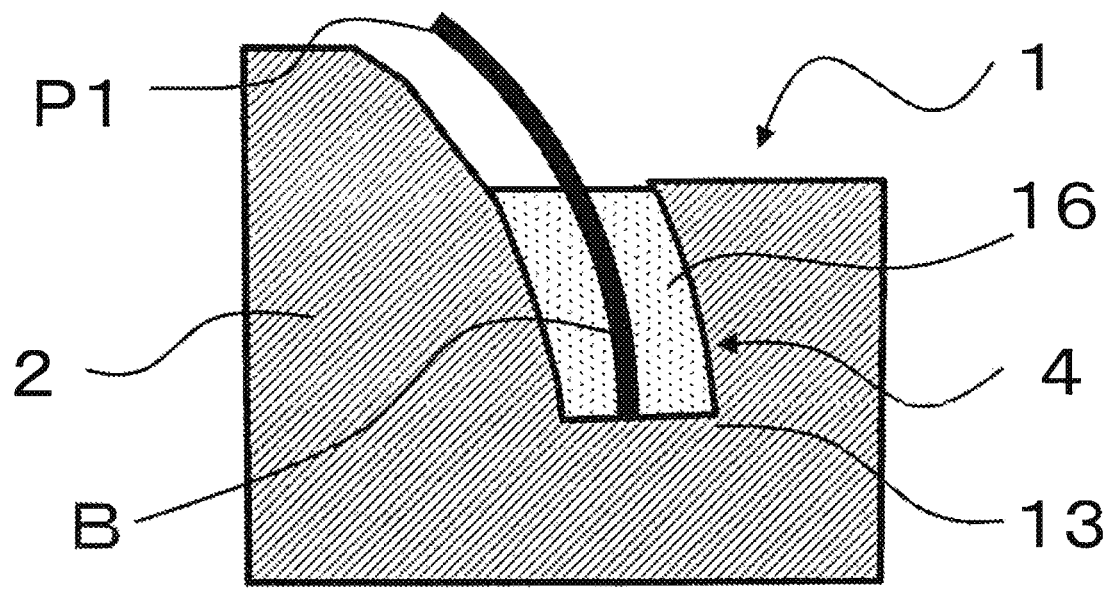
FIG. 19 is a cross-sectional view of an essential portion describing a tenth embodiment of the molding mold for a composite body.

The molding mold for a composite body 1 illustrated in FIG. 19 has the panel fixing mechanism 4 disposed in the fixed mold 2, and includes the recess portion 13 that houses and fixes the edge portion of the outer panel P1 in the state in which the fixed mold 2 and the movable mold 3 are open. Furthermore, the panel fixing mechanism 4 includes, within the recess portion 13, sand 16 that buries the edge portion of the outer panel P1.

The molding mold for a composite body 1 including the panel fixing mechanism 4 described above, as with the previous embodiments, integrates the resin member R with the outer panel P1, and can form a favorable exposed metal portion B on the edge portion of the outer panel P1 by the recess portion 13 housing the sand 16, without generating burr in the resin member R.

Moreover, since the molding mold for a composite body 1 described above buries the edge portion of the outer panel P1 in the sand 16 within the recess portion 13, the intrusion of the molten resin is securely inhibited by the sand 16, thus allowing for forming a favorable exposed metal portion B at the edge portion of the outer panel P1.

Eleventh Embodiment

Figure 20:
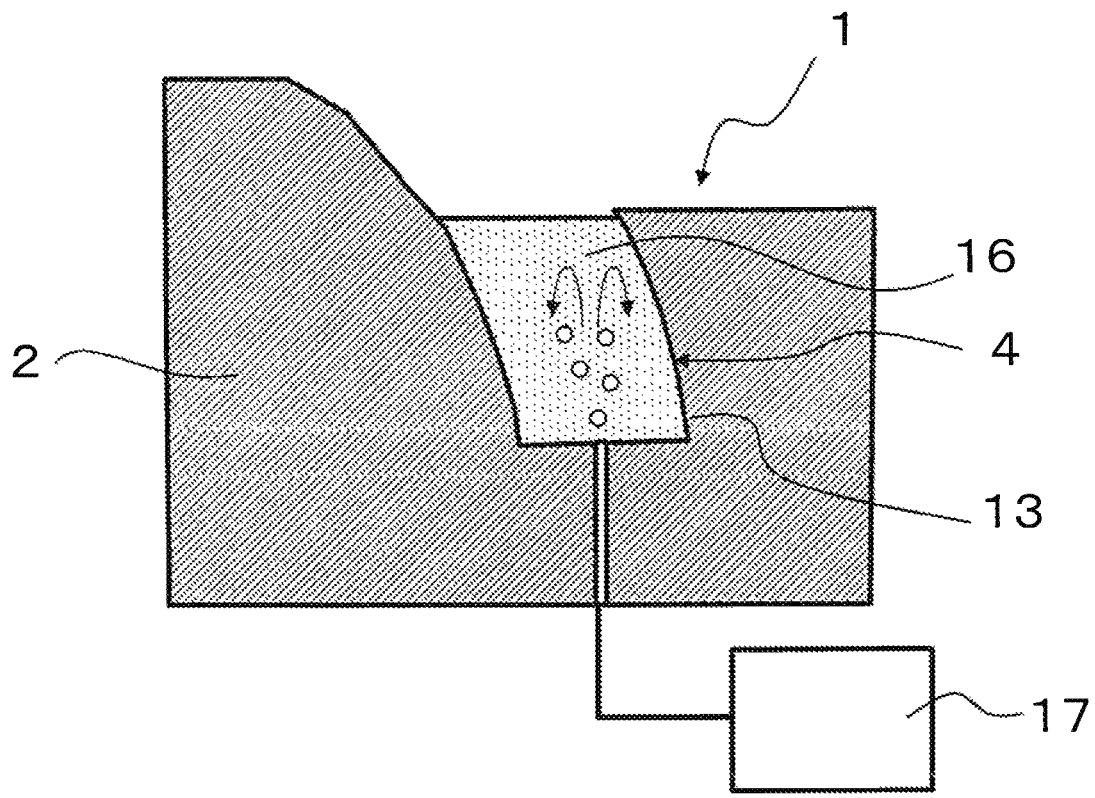
FIG. 20 is a cross-sectional view of an essential portion describing an eleventh embodiment of the molding mold for a composite body.

The molding mold for a composite body 1 illustrated in FIG. 20 has the panel fixing mechanism 4 disposed in the fixed mold 2, and includes the recess portion 13 that houses and fixes the edge portion of the outer panel P1 in the state in which the fixed mold 2 and the movable mold 3 are open. Furthermore, the panel fixing mechanism 4 has, within the recess portion 13, the sand 16 housed to bury the edge portion of the outer panel P1, and also includes an air feeding system that feeds air into the sand from the bottom portion of the recess portion 13, to form fluid sand.

The molding mold for a composite body 1 including the panel fixing mechanism 4 described above, as with the previous embodiments, integrates the resin member R with the outer panel P1, and can form a favorable exposed metal portion B on the edge portion of the outer panel P1 by the recess portion 13 having the sand 16 and the air feeding system 17, without generating burr in the resin member R.

Figure 21:
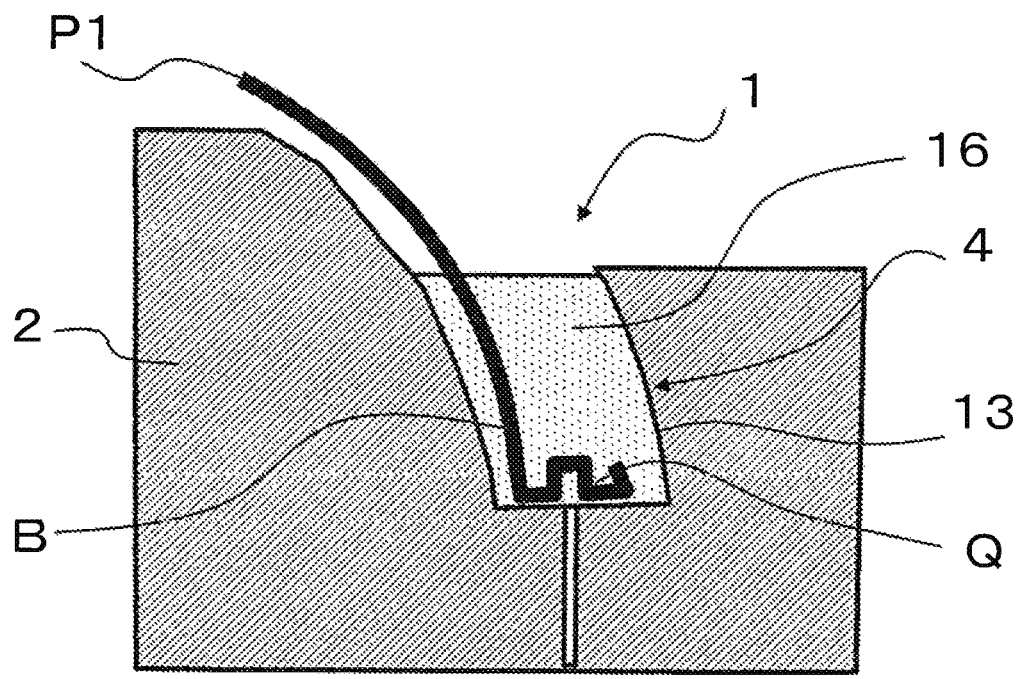
FIG. 21 is a cross-sectional view illustrating a state in which the edge portion of a metal panel is fixed in continuation to FIG. 20.

Moreover, since the molding mold for a composite body 1 described above feeds air into the sand 16 within the recess portion 13 by the air feeding system 17 to form fluid sand, even in a case in which the edge portion of the outer panel P1 has a complex curved portion Q as illustrated in FIG. 21, the edge portion including this curved portion Q can be buried in the sand easily and securely. Furthermore, by stopping the feeding of air into the sand 16 of the recess portion 13, the molding mold for a composite body 1 can position the edge portion of the outer panel P1 by the sand 16, and can inhibit the intrusion of the molten resin by the sand 16, thus allowing for forming a favorable exposed metal portion B at the edge portion of the outer panel P1.

The molding molds for a composite body 1 described in the first to eleventh embodiments integrally mold the resin member R on the metal panel (outer panel P1) by injection molding of resin, and thus the fixed mold 2 was illustrated as the example of the mold on the resin member side to fix the edge portion of the metal panel.

However, the molding mold for a composite body according to the present invention in principle disposes the metal panel on the fixed mold to integrally mold the resin member; hence, the mold on the resin member side to fix the edge portion of the metal panel is any one of the fixed mold and the movable mold depending on the feeding position of the molten resin with respect to the metal panel.

Figure 22:
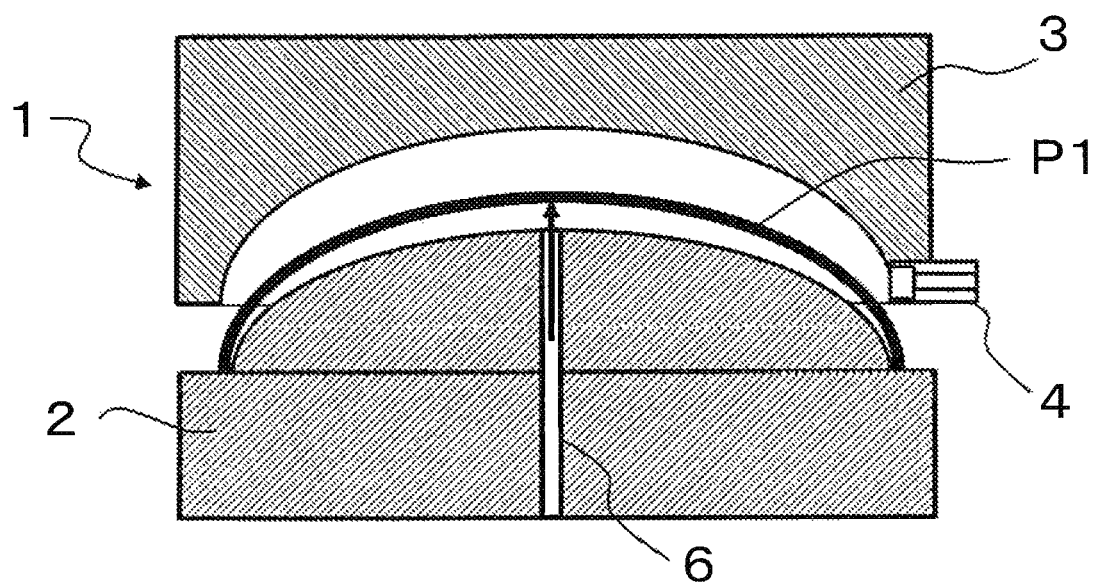
FIG. 22 is a cross-sectional view describing injection molding of resin.

That is to say, as illustrated in FIG. 22, the molding mold for a composite body 1 that performs injection molding of resin has the feeding path 6 for the molten resin in the fixed mold 2 on the lower side, and integrally molds the resin member on a main surface on a lower side of the metal panel P1 disposed on the fixed mold 2. Namely, in the molding mold for a composite body 1 illustrated in FIG. 22, the feeding position of the molten resin is on the lower side of the metal panel P1; in this case, the mold on the resin member R side to fix the edge portion of the metal panel P1 is the fixed mold 2 as with the first to eleventh embodiments. Furthermore, the molding mold for a composite body 1 includes, in the movable mold 3, the panel fixing mechanism 4 that fixes the edge portion of the metal panel P1 in the state in which the fixed mold 2 and the movable mold 3 are open. The operation of the panel fixing mechanism 4 is, for example, the same as the first and second embodiments (see FIGS. 1 to 7).

Figure 23:
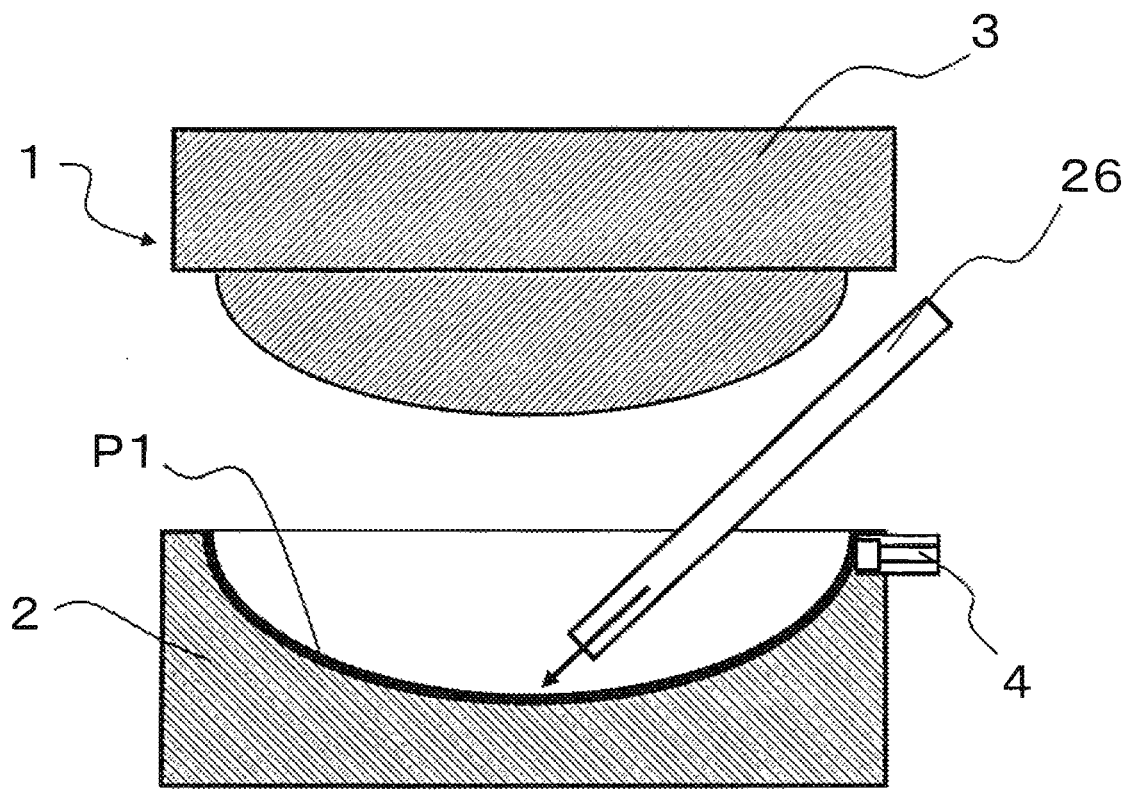
FIG. 23 is a cross-sectional view describing compression molding of resin.

Moreover, as illustrated in. FIG. 23, there exists a molding mold for a composite body 1 that performs compression molding of resin which includes a feeding body 26 for the molten resin, which feeding body 26 is advanceable and retractable between the fixed mold 2 and the movable mold 3, and integrally molds the resin member on a main surface on an upper side of the metal panel P1 disposed on the fixed mold 2. Namely, in the molding mold for a composite body 1 illustrated in FIG. 23, the feeding position of the molten resin is on the upper side of the metal panel P1; in this case, the mold on the resin member R side to fix the edge portion of the metal panel P1 is the movable mold 3. Furthermore, the molding mold for a composite body 1 illustrated in FIG. 23 includes, in the fixed mold 2, the panel fixing mechanism 4 that fixes the edge portion of the metal panel P1 with respect to the movable mold 3. The operation of the panel fixing mechanism 4 is, for example, the same as the first and second embodiments (see FIGS. 1 to 7).

Here, the metal panel is one that is press worked into a predefined three-dimensional shape as represented by the outer panel P1 of an automobile, and thus has unavoidable shape errors. Such a metal panel, upon being disposed on the fixed mold 2, can easily become unstable in the positioning of the edge portion in either of the injection molding or compression molding of resin; hence the molten resin may intrude between this edge portion and the fixed mold 2 and thus may prevent the forming of a favorable exposed metal portion 5.

Accordingly, the molding mold for a composite body according to the present invention selects, as the mold on the resin member side that fixes the edge portion of the metal panel, a mold of either the fixed mold or the movable mold depending on the feeding position of the molten resin with respect to the panel, and employs the panel fixing mechanism to fix the edge portion of the metal panel in a state in which the fixed mold and the movable mold are open, to the selected mold.

Accordingly, the molding mold for a composite body according to the present invention may be applied to any one of injection molding and compression molding of resin, and in either case, allows for forming the exposed metal portion on the edge portion of the metal panel on the resin member side by using no movable body with respect to the molding space of the resin member R as like the conventional sliding mold. Therefore, the molding mold for a composite body can manufacture a composite body that integrates the resin member on one main surface of the metal panel and has a favorable exposed metal portion on its edge portion, without generating burr.

The configuration of the molding mold for a composite body according to the present invention is not limited to those of the above-described embodiments. Suitable changes can be made without departing from the features of the present invention and the configurations described in the embodiments can be combined, and as a matter of course may be applied to a metal panel other than the outer panel.

REFERENCE SIGNS

A Composite body
B Exposed metal portion
P1 Outer panel (metal panel)
R Resin member
1 Molding mold for a composite body
2 Fixed mold
3 Movable mold
4 Panel fixing mechanism
7,12 Slide pad (panel fixing mechanism)
11 Elastic pad (panel fixing mechanism
13 Recess portion (panel fixing mechanism)
15 Elastic body (panel fixing mechanism)
16 Sand (panel fixing mechanism)
17 Air feeding system (panel fixing mechanism)

The invention claimed is:

1. A mold for forming a composite body, in which a resin member is integrally molded on one main surface of a metal panel, the mold comprising:
   at least a fixed mold and a movable mold, the fixed mold being on a resin member side and the movable mold being on a metal panel side; and
   a panel fixing mechanism configured to fix an edge portion of the metal panel to the fixed mold in a state in which the fixed mold and the movable mold are open,
   wherein an exposed metal portion is formed on the edge portion of the metal panel on a side of the fixed mold side by the panel fixing mechanism.

2. The mold according to claim 1, wherein the panel fixing mechanism includes:
   a slide pad disposed in any one mold of the fixed mold and the movable mold, wherein the slide pad is advanceable and retractable and is configured to press the edge portion of the metal panel against the fixed mold when the slide pad is advanced so as to closely contact the fixed mold.

3. The mold according to claim 1, wherein the panel fixing mechanism includes;
   an elastic pad disposed in any one mold of the fixed mold and the movable mold, wherein the elastic pad is expandable and contractable and is configured to press the edge portion of the metal panel against the fixed mold when the elastic pad is expanded so as to closely contact the fixed mold.

4. The mold according to claim 1, wherein the panel fixing mechanism includes a recess portion formed in the fixed mold, the recess portion configured to house the edge portion of the metal panel.

5. The mold according to claim 4, wherein the recess portion of the panel fixing mechanism has a width dimension gradually decreasing from an opening of the recess portion until reaching a bottom portion of the recess portion.

6. The mold according to claim 4, wherein the recess portion of the panel fixing mechanism has a width dimension gradually increasing from a middle portion of the recess portion until reaching a bottom portion of the recess portion.

7. The mold according to claim 4, wherein the recess portion of the panel fixing mechanism has a width dimension gradually decreasing from an opening of the recess portion until reaching a middle portion of the recess portion, and gradually increasing from the middle portion until reaching a bottom portion of the recess portion.

8. The mold according to claim 4, wherein the recess portion of the panel fixing mechanism has a width dimension meandering from an opening of the recess portion until reaching a bottom portion of the recess portion.

9. The mold according to claim 4, wherein the panel fixing mechanism includes, within the recess portion, an elastic body configured to sandwich the edge portion of the metal panel.

10. The mold according to claim 4, wherein the panel fixing mechanism houses, within the recess portion, sand configured to bury the edge portion of the metal panel.

11. The mold according to claim 10, wherein the panel fixing mechanism includes an air feeding system configured to feed air into the sand from a bottom portion of the recess portion to form fluid sand.

12. The mold according to claim 1, wherein an entirety of a surface of the edge portion of the metal panel opposite the panel fixing mechanism is exposed from the resin member.

* * * * *